US011675080B2

(12) United States Patent
Hoegele et al.

(10) Patent No.: US 11,675,080 B2
(45) Date of Patent: Jun. 13, 2023

(54) METHOD AND APPARATUS FOR DETERMINING AT LEAST ONE SPATIAL POSITION AND ORIENTATION OF AT LEAST ONE OBJECT

(71) Applicant: Carl Zeiss Industrielle Messtechnik GmbH, Oberkochen (DE)

(72) Inventors: Wolfgang Hoegele, Rosenheim (DE); Volker Rasenberger, Raubling (DE); Florian Rettich, Munich (DE); Thomas Mayer, Kolbermoor (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 935 days.

(21) Appl. No.: 16/249,881

(22) Filed: Jan. 16, 2019

(65) Prior Publication Data

US 2019/0219698 A1    Jul. 18, 2019

(30) Foreign Application Priority Data

Jan. 17, 2018  (DE) ..................... 10 2018 200 722.5
Dec. 20, 2018  (DE) ..................... 10 2018 222 629.6

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4804* (2013.01); *G01S 7/4818* (2013.01); *G01S 17/875* (2013.01); *G01S 17/66* (2013.01)

(58) Field of Classification Search
CPC ...... G01S 17/42; G01S 7/4804; G01S 7/4818; G01S 17/817; G01S 17/66; G01S 17/26;
(Continued)

(56) References Cited

U.S. PATENT DOCUMENTS 7,358,516 B2   4/2008 Holler et al.
8,760,341 B2 * 6/2014 Nakagawa ............ G01S 13/584
                                                342/128
(Continued)

FOREIGN PATENT DOCUMENTS

DE         10118392 A1   11/2002
DE    102009024464 A1   12/2010
(Continued)

OTHER PUBLICATIONS

Chip-scale Lidar, Benham Behroozpur Baghmisheh, Technical Report No. UCB/EECS.2017-4 (Jan. 19, 2017).
(Continued)

*Primary Examiner* — Isam A Alsomiri
*Assistant Examiner* — Sanjida Naser
(74) *Attorney, Agent, or Firm* — Ewers IP Law PLLC; Falk Ewers

(57) ABSTRACT

An apparatus for determining at least one spatial position and orientation of at least one object with at least three retroreflectors is provided. The apparatus has at least one LIDAR unit with at least three measurement channels. The LIDAR unit has at least one illumination device, which is configured to produce at least one frequency modulated input light beam. The LIDAR unit has at least one first beam splitter, wherein the first beam splitter is configured to divide the input light beam among the measurement channels in parallel and/or in sequence. The measurement channels are each configured to produce at least one measurement signal. The LIDAR unit is configured to produce at least one LIDAR signal for the measurement signals. The apparatus has at least one evaluation unit, which is configured to determine the spatial position and orientation of the object from the LIDAR signal.

20 Claims, 10 Drawing Sheets

(51) Int. Cl.
*G01S 17/875* (2020.01)
*G01S 7/48* (2006.01)
*G01S 17/66* (2006.01)

(58) Field of Classification Search
CPC ........ G01S 17/06; G01S 7/4808; G01S 7/403; G01S 17/875
See application file for complete search history.

(56) References Cited

U.S. PATENT DOCUMENTS

| | | | |
|---|---|---|---|
| 8,780,331 B2 | 7/2014 | Spruck et al. | |
| 8,913,636 B2 | 12/2014 | Roos et al. | |
| 9,025,141 B1* | 5/2015 | Soreide | G01B 9/02003 356/5.11 |
| 9,329,027 B2 | 5/2016 | Schmidt et al. | |
| 9,559,486 B2 | 1/2017 | Roos et al. | |
| 2011/0007326 A1 | 1/2011 | Daxauer et al. | |
| 2011/0205523 A1 | 8/2011 | Rezk et al. | |
| 2012/0194823 A1* | 8/2012 | Moore | G01B 9/02091 356/450 |
| 2013/0050410 A1 | 2/2013 | Steinbichler et al. | |
| 2013/0261612 A1* | 10/2013 | Yokosuka | A61B 3/12 606/4 |
| 2014/0043622 A1* | 2/2014 | Vandenhoudt | G01S 3/78 29/407.04 |
| 2015/0268425 A1* | 9/2015 | de Jong | G02B 6/4214 385/33 |
| 2017/0123052 A1 | 5/2017 | Hinderling | |
| 2017/0155225 A1* | 6/2017 | Villeneuve | H01S 3/06758 |
| 2017/0258531 A1 | 9/2017 | Bodjanski | |

FOREIGN PATENT DOCUMENTS

| | | |
|---|---|---|
| DE | 102010039948 A1 | 3/2012 |
| EP | 3165876 A2 | 5/2017 |

OTHER PUBLICATIONS

Office Action issued in German Patent Application No. DE 10 2018 222 629.6 (from which this application claims priority), dated Mar. 9, 2022 and English language translation thereof.

* cited by examiner

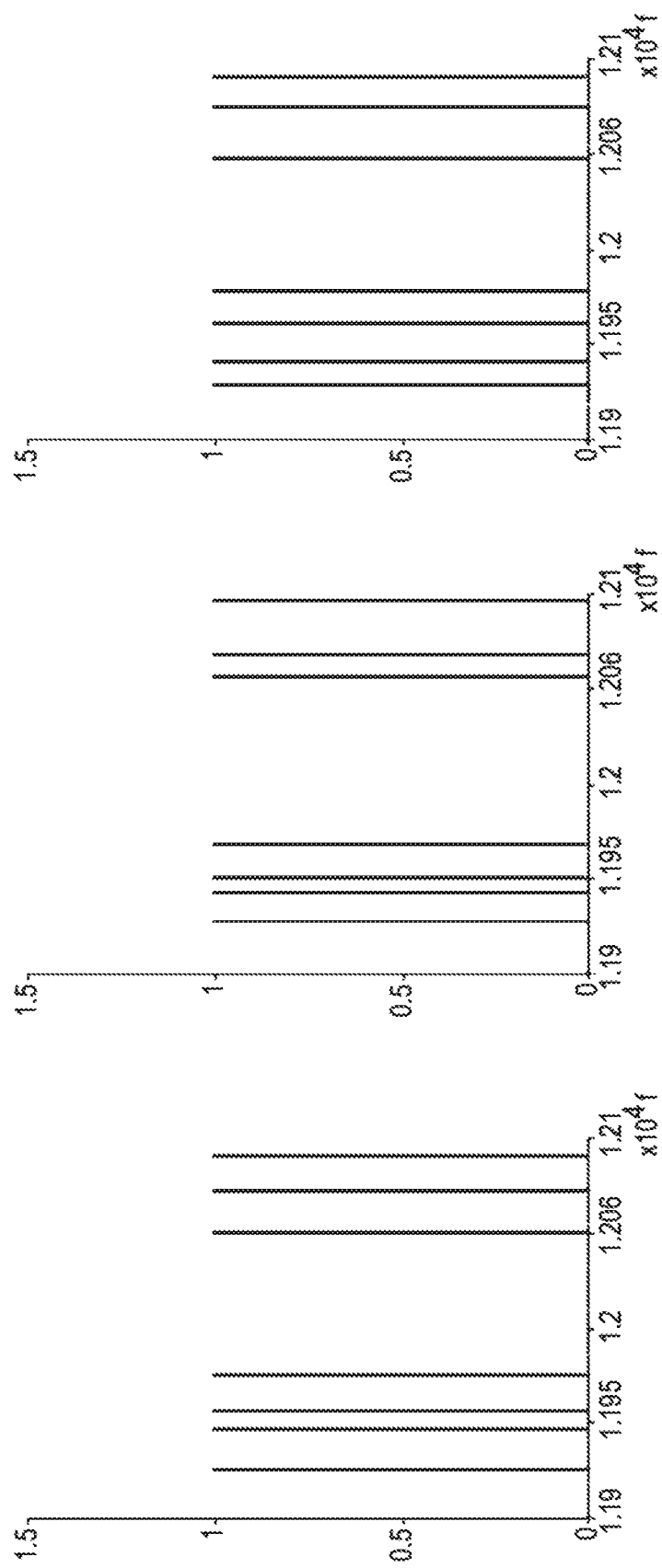

METHOD AND APPARATUS FOR DETERMINING AT LEAST ONE SPATIAL POSITION AND ORIENTATION OF AT LEAST ONE OBJECT

CROSS REFERENCE TO RELATED APPLICATIONS

This application claims priority to German patent applications DE 10 2018 200 722.5, filed on Jan. 17, 2018 and DE 10 2018 222 629.6, filed on Dec. 20, 2018, the entire contents of which are incorporated herein by reference.

TECHNICAL FIELD

The invention relates to an apparatus for determining at least one spatial position and orientation of at least one object and to a method for determining at least one spatial position and orientation of at least one object. In particular, the present invention relates to the field of coordinate measuring technology for measuring very large components.

BACKGROUND

Very large coordinate measuring machines and/or laser trackers or laser tracers are used in the field of measuring very large components, such as component parts of wind turbines, for example. However, the production of such apparatuses with the desired high accuracy even in the case of large measurement paths and different ambient conditions is complicated and leads to high costs.

Measuring methods are known, in which a measuring head of a sensor probes a large component and the measuring head is positioned and aligned in a measurement volume by a distance measuring apparatus and an additional angle measuring apparatus.

US 2014/0043622 A1, for example, describes a system for measuring the position of an object in a measurement volume, including an optical angle measuring apparatus, which is arranged with a static optical unit and which is configured to measure the azimuth and elevation angle of the object in the measurement volume. In addition to the optical angle measuring apparatus, there is a distance measuring apparatus, which is arranged with a static component, configured for measuring the distance of the object in the measurement volume.

DE 10 2009 024 464 A1 describes an evaluation device for a path length measurement, which is configured to evaluate as a function of time a measurement signal representing an intensity of a sequence of pulses of electromagnetic radiation, in particular a sequence of light pulses, after passing through a path length to be measured. The sequence of pulses is produced with a repetition rate by a radiation source, in particular a light source. The evaluation device is configured to evaluate a first component of the measurement signal, which oscillates at a first frequency, and a second component of the measurement signal, which oscillates at a second frequency that is higher than the first frequency. The first frequency can correspond to the repetition rate or a multiple of the repetition rate. The second frequency can correspond to a further multiple of the repetition rate.

EP 3 165 876 A2 describes an optoelectronic measuring appliance for determining a distance and/or position, including a radiation source for producing optical measurement radiation at a first wavelength, wherein the measurement radiation is emitted into the free space in directed fashion. The radiation source is embodied in such a way that the first wavelength lies in the range between 1210 nm and 1400 nm and the power of the emitted measurement radiation is at least 14 mW in the temporal and spatial means.

However, such known methods and apparatuses are complex and require at least two measurement systems, one for measuring the spatial position and one for measuring the angle. Furthermore, large measurement uncertainties may arise as a result of using different measurement systems for determining the spatial position and for measuring the angle.

SUMMARY

It is therefore an object of the present invention to provide an apparatus and a method for determining at least one spatial position and orientation of at least one object, which at least largely avoid the disadvantages of known apparatuses and methods. In particular, at least one spatial position and orientation of at least one object should be determined with improved accuracy and less complexity.

This object is achieved by a device and a method as disclosed herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. By way of example, the expression "A has B", "A comprises B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by the person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

According to a first aspect of the present invention, an apparatus for determining at least one spatial position and orientation of at least one object with at least three retroreflectors is provided.

An object in the context of the present invention can be understood to mean an object to be measured that has any shape. By way of example, the object can be a measuring head of a sensor or a tool, by which a component can be probed. The object has at least three retroreflectors. A retroreflector can be understood to mean an apparatus that reflects an incident light beam. By way of example, the retroreflector can be a marker. By way of example, the retroreflector can be selected from the group consisting of: a cat's eye, spherical lenses with a reflection layer, a marker as described in US 2011/0007326 A1, US 2013/0050410 A1 or US 2017/0258531 A1, the contents of which are herewith incorporated by reference into this application, a cube prism, and a corner cube. The retroreflectors can be arranged on the object in secured and/or interchangeable fashion. A position of the retroreflectors on the object can be known. The object may have a plurality of retroreflectors, in particular more than three retroreflectors, for example four, five, six or more retroreflectors.

The spatial position and the orientation can be determined in a coordinate system, for example a Cartesian coordinate system or a spherical coordinate system. Other coordinate systems are also conceivable. An origin or zero of the coordinate system can be at a point of the apparatus. A spatial position can be understood to mean a three-dimensional point (X, Y, Z) in the coordinate system, in particular a position of the object. An orientation can be understood to mean an alignment of the object, in particular an angular position in the measurement volume. The orientation can be specified by at least three angles, for example a Euler angle or inclination angle, a roll angle and a yaw angle.

The apparatus has at least one light detection and ranging (LIDAR) unit with at least three measurement channels. The LIDAR unit has at least one illumination device, which is configured to produce at least one frequency modulated input light beam. The LIDAR unit has at least one first beam splitter. The first beam splitter is configured to divide the input light beam among the measurement channels in parallel and/or in sequence. The measurement channels are each configured to produce at least one measurement signal. The LIDAR unit is configured to produce at least one LIDAR signal for the measurement signals. The apparatus has at least one evaluation unit, which is configured to determine the spatial position and orientation of the object from the LIDAR signal.

A LIDAR unit can be understood to mean an apparatus that is based on the LIDAR measurement principle, which is also referred to as laser detection and ranging (LADAR). As described above, the LIDAR unit has at least one illumination device, which is configured to produce at least one frequency modulated input light beam, a so-called "frequency modulated continuous wave" (FMCW). The LIDAR unit can be configured to produce the input light beam, the frequency of which is tuned continuously, according to the FMCW method. By way of example, the frequency of the input light beam can be linearly modulated with time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit can be configured like in U.S. Pat. Nos. 9,559,486 B2, 8,913,636 B2, or 2016/123718 A1.

An "illumination device" can be understood to mean a device configured to produce a light beam. In the context of the present invention, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, a spectral range of 100 nm to 380 nm. IR light, that is to say light from the infrared spectral range, is preferably used in the context of the present invention. The term "light beam" can be understood to mean, in principle, a quantity of light which is emitted and/or radiated in a specific direction. The illumination device can have at least one light source. An input light beam can be understood to mean a light beam which has a modulated frequency, e.g., a linearly modulated frequency, and which is at least partly couplable into the measurement channels. The illumination device can have at least one FMCW light source. The illumination device can have at least one adjustable (tunable) laser source, for example at least one distributed feedback (DFB) laser diode or a distributed Bragg reflector (DBR) laser diode.

A measurement channel can be understood to mean an element of the LIDAR unit, which is configured to illuminate at least one retroreflector with at least one portion of the input light beam and to capture at least one beam that was reflected by the at least one retroreflector. The measurement channels can be configured identically or differently. The LIDAR unit can have a plurality of measurement channels, for example four, five or more measurement channels. The measurement channels can be configured at least partly separated from one another in space and/or time. "At least partly separated in space" can be understood to mean that spatially non-separated portions of the measurement channels are possible, wherein at least one portion of the respective measurement channels is separated from the other measurement channels in space. Here, "at least partly separated in time" can be understood to mean that the measurement channels are operated at different times, with a time overlap being possible. By way of example, a second beam splitter, described further down, can be configured in such a way that only one deflection mirror is actuated and, for the different retroreflectors, the deflection mirror is adjustable onto the respective retroreflectors with a time offset.

The measurement channels can each have at least one optical fiber, in particular at least one monomode fiber and/or at least one multimode fiber. Typically, the optical fibers can have different lengths. This can facilitate the separation of the respective measurement channels in a frequency spectrum, as described below. The optical fibers can each have a length offset. A length offset can be understood to mean a delay line of arbitrary length. The length offset of the optical fibers can be such that respective frequency spectra of the measurement channels are identifiable and/or separable in the frequency spectrum described below.

The measurement channels can each have at least one first optical element. The first optical element can be configured to output couple the input light beam passing through the respective optical fiber out of the optical fiber and input couple a light beam reflected by at least one retroreflector into the respective optical fiber. The optical fibers can have a fiber beginning and a fiber end, wherein at least one portion of the input light beam passes through the respective optical fiber from fiber beginning to fiber end. The first optical element can be arranged at the fiber end. The optical element can include an output coupling optical unit. The optical element can include an input coupling optical unit. The output coupling optical unit and the input coupling optical unit can be identical.

The measurement channels can each have at least one static or adjustable mirror. By way of example, the apparatus can have at least one controller, which is configured to actuate the mirror and set the latter into any angle position.

The LIDAR unit can be configured to operate the measurement channels in parallel and/or in sequence. In the case of a parallel operation, a measurement of a plurality of distances at the same time can be facilitated. As explained above, the LIDAR unit has at least one first beam splitter, in particular a multiplexer. A beam splitter can be understood to mean an apparatus, which is configured to supply the input light beam to at least one measurement channel and/or to divide, at least in part, the input light beam among the measurement channels in parallel and/or in sequence. The first beam splitter can be configured to supply the entire input light beam to a first measurement channel and to successively supply it to a second and a third measurement channel. As an alternative or in addition thereto, the beam splitter can be configured to divide the input light beam into at least two portions. The first beam splitter can be configured to divide the input light beam among the measurement channels in parallel and/or in sequence. The first beam splitter can be arranged upstream of the respective optical fiber of the measurement channel in the propagation direction of the input light beam.

Further, the measurement channels can each have at least one second beam splitter. The second beam splitter can be arranged downstream of the respective optical fiber of the measurement channel in the propagation direction of the input light beam. The second beam splitter can be configured to provide the input light beam in parallel and/or in sequence for the purposes of illuminating at least one of the retroreflectors. "Providing the input light beam" can be understood to mean an impingement with the input light beam.

The measurement channels can each have at least one optical unit, which is configured to expand a light beam into a solid angle such that the at least three retroreflectors are irradiated. By way of example, the measurement channels can each have a wide-angle lens. The optical unit can have at least one converging lens or a concave lens. Typically, use can be made of a converging lens, which facilitates an approximately tilted plane wave front at the retroreflector and good efficiency during the input coupling at the focus. Each retroreflector can send back some of the light beam incident thereon.

The measurement channels are each configured to produce at least one measurement signal. A measurement signal can be understood to mean a signal that was reflected by at least one retroreflector, in particular a reflected light beam. The measurement signal of each measurement channel can be an output light beam of the respective measurement channel. The LIDAR unit can have at least one sensor element, which is configured to detect the measurement signals of the measurement channels. "Detecting the measurement signals of the measurement channels" can be understood to mean detecting the individual measurement signals and/or detecting the superposed measurement signals of the measurement channels. In the context of the present invention, a "sensor element" can be understood to mean any apparatus that is configured to receive the measurement signals of the measurement channels. The sensor element can have at least one photodiode.

The LIDAR unit is configured to produce at least one LIDAR signal for each measurement channel. The LIDAR unit can be configured to produce a reference light beam. The LIDAR unit can have at least one reference arm. The reference light beam can be a current input light beam which is supplied to the sensor element via the reference arm of the LIDAR unit, for example. The sensor element can be configured to superpose the measurement signals of the measurement channels on the reference light beam. A "LIDAR signal" can be understood to be a signal of the LIDAR unit, which has at least one information item about a frequency difference, also referred to as frequency delta, between the reference light beam and measurement signal. The LIDAR signal can be a signal in which the reference light beam is superposed on the measurement signals of the measurement channels. The LIDAR signal can be a frequency spectrum of a beat signal of the reference light beam, on which the measurement signals have been superposed. The LIDAR unit can be configured to superpose the reference light beam on at least one measurement signal and determine a frequency spectrum of an arising beat signal. The first beam splitter can be configured to superpose the measurement signals of the three measurement channels. The LIDAR unit can be configured to superpose the reference light beam on the superposed measurement signals and determine a frequency spectrum of an arising beat signal. The LIDAR unit can be configured to determine at least three peaks in the frequency spectrum for each retroreflector and determine the spatial position and orientation of the object therefrom.

The apparatus has at least one evaluation unit, which is configured to determine the spatial position and orientation of the object from the LIDAR signal. Here, an "evaluation unit" can be understood, in general, to mean an electronic apparatus that is configured to evaluate signals produced by the measurement channels, in particular the sensor element. By way of example, one or more electronic connections between the measurement channels, in particular the sensor element, and the evaluation unit can be provided for this purpose. The evaluation unit can include, for example, at least one data processing apparatus, for example at least one computer or microcontroller. The data processing apparatus can have one or more volatile and/or non-volatile data memories, wherein the data processing apparatus can be configured, for example, in terms of programming to drive the sensor element. The evaluation unit can furthermore include at least one interface, for example an electronic interface and/or a human-machine interface such as, for example, an input/output apparatus such as a display and/or a keyboard. The evaluation unit can be constructed, for example, centrally or else in a decentralized manner. Other configurations are also conceivable. The evaluation unit can have at least one A/D converter.

The evaluation unit is configured to determine the spatial position and orientation of the object from the LIDAR signal. The evaluation unit can be configured to determine a frequency spectrum of the LIDAR signal, in particular the beat signal, by a Fourier transform. The frequency spectrum can have a plurality of maximums, so-called peaks. The evaluation unit can be configured to identify the peaks in the frequency spectrum. By way of example, the evaluation unit can be configured to identify at least nine peaks in the case of a parallel measurement in the three measurement channels. The evaluation unit can be configured to assign the peaks to a measurement channel in each case. By way of example, in the case of a parallel measurement with three measurement channels, the evaluation unit can be configured to assign the nine identified peaks to 3×3 groups, which are also referred to as measurement channel groups. A spatial position of the three retroreflectors can be determined from the information items about the exact distribution and/or arrangement of the peaks in the individual groups. A 3D point can be determined from three lengths in different directions. A complete 6D information item can be determined in the case of a known arrangement of the retroreflectors on the object.

The evaluation unit can be configured to carry out a calibration method. The evaluation unit can be configured to calibrate a fit function. At least one frequency spectrum can be determined in the calibration method for at least one retroreflector with a known spatial position. The evaluation unit can be configured to determine at least three peaks in the frequency spectrum and calibrate these with the known spatial position of the retroreflector. Here, this fit function can be a 3D polynomial for each measurement channel, for example, wherein the three (x, y, z)-coordinates of the known spatial position of the retroreflector are mapped onto the frequency position in the respective channel. The fit function can have at least three such 3D polynomials since use is made of at least three measurement channels. By numerically inverting this function, the evaluation unit can be configured to calculate the three (x, y, z)-coordinates of the retroreflector with a known 3D point from the at least 3 measurement channel signals. Here, this invertibility is guaranteed by virtue of it not being possible to map any two 3D points onto the same frequency positions in the spectrum as a result of the geometric arrangement of the measurement channels.

By way of example, the evaluation unit can be configured to fit the frequency spectrum with an empirically or semi-empirically determined and/or determinable function under the assumption of a known position of the retroreflectors on the object and thus determine the 6D information items. A last-known position of the retroreflectors can be used as initial value. As a result of at least three retroreflectors and at least three measurement channels, at least 9 peaks may arise in the frequency spectrum of the LIDAR signal, which lead by the simple separation into three measurement channel groups to at least $3^3=27$ expedient 3-peak-tuples and, as a result thereof, 27 possible 3D positions, so-called candidates, are found. Here, the correct or actual three 3D positions can be selected by calculating the distances, e.g., the Euclidean distances, between all 3-subsets of the 27 candidates to the last found value, the so-called start value. Here, this 3-subset with the smallest summed distances from the start value may constitute a suggestion for the correct 3 3D points which have the 6D information item. In particular, the geometric arrangement of the markers on the measuring head can also be taken into account as validity criterion in this selection, as can, also, the predictions for the 3D points that arise from the temporal change of the 6D information items at earlier times, taking account of the expected inertia of the movement of the measuring head.

As explained above, there can be a parallel measurement in the three measurement channels. During the superposition of the measurement signals and the reference light beam, which is also referred to as reference signal, this may lead not only to interferences arising between the respective measurement signal and reference signal as a result thereof, but also to interferences between the individual measurement signals. The apparatus is configured in such a way that a separation of the peaks as a result of interferences from superposing the respective measurement signals from the peaks as a result of interferences from superposing the reference light beam on the respective measurement signals is possible. By way of example, at least one parameter from the group consisting of: depth distances of the retroreflectors on the object, length offset of the optical fibers, length of a signal analysis time window, measurement volume depth, and sampling frequency of the A/D-converter can be selected in such a way that a separation of the peaks in the frequency spectrum is possible. The evaluation unit can be configured to separate the interferences from superposing the respective measurement signals from the interferences from superposing the respective measurement signals on the reference light beam. The evaluation unit can have at least one band-pass and/or high-pass filter.

In a first exemplary embodiment, the first beam splitter can be configured to divide the input light beam among the three measurement channels in parallel. By way of example, the input light beam of the LIDAR unit can be divided into the at least three measurement channels by way of a parallel multiplexer and can be input coupled into the optical fibers, which are characterized by the individual length offset. At least one mirror, in particular a deflection mirror, can be arranged at the fiber end. The measurement channels can each have at least one optical unit, which is configured to expand a light beam into a solid angle such that the at least three retroreflectors are irradiated. By way of example, the measurement channels can each have a wide-angle lens. The optical unit can have at least one converging lens or a concave lens. Typically, use can be made of a converging lens, which facilitates an approximately tilted plane wave front at the retroreflector and good efficiency during the input coupling at the focus. Each retroreflector can send back some of the light beam incident thereon. The returned light beams can propagate in the measurement channels back through the optical unit, which consequently becomes an input coupling optical unit into the optical fiber, and back through the first beam splitter, which consequently leads to a superposition of all reflected beams. The LIDAR unit can be configured to superpose a reference light beam, in particular a current input light beam, on the superposed beams such that interferences arise. A beat signal can arise in this exemplary embodiment, the frequency spectrum of which has at least nine relevant peaks which have the 6D information items. As explained above, the evaluation unit can be configured to fit the frequency spectrum and determine the 6D information items. The evaluation unit can be configured to divide the frequency spectrum with many peaks among the three measurement channel groups. Here, a respective retroreflector can always be arranged in one of these measurement channel groups as a peak. The evaluation unit can be configured to determine all possible 3D positions that emerge from these peaks. By way of example, three peaks in the three measurement channel groups may yield $3^3=27$ 3D positions. The evaluation unit can be configured to determine three "best fit" 3D points for the retroreflectors by a start value relating to the position of the retroreflectors, for example relating to last measurement time and a geometric arrangement of the retroreflectors. The apparatus can be configured to determine a start value, for example at the start of a measurement of a very large component. To this end, a uniqueness of the position of the retroreflectors in 3D space can be implemented by setting all retroreflectors blind apart from one and by periodically rotating through this using the other retroreflectors. Thus, a unique, good start orientation, i.e., start values for determining the 6D information (spatial position and orientation), can be determined by a timestamp. Alternatively, it is likewise possible to define a fixedly predetermined volume in the measurement region of this apparatus, in which volume a fixed alignment of the measuring head with the associated retroreflectors can be retrieved again in very reliable fashion by the system, and it is consequently possible to very stably retrieve a lost tracker signal as soon as there is a movement into this volume with the correct alignment of the measuring head. This first exemplary embodiment allows a determination of 6D information items with an improved accuracy and less complexity. The measurement accuracy only depends directly on the accuracy of the LIDAR unit, which can be particularly insensitive to noise. Furthermore, changing at least one retroreflector on the object can be very simple as no individual retroreflectors are illuminated; instead, at least three retroreflectors are irradiated by an expanded beam.

The apparatus can be configured to track the object. "Tracking" can be understood to mean following a movement of the object at various times. As explained above, an expanded light beam can be used in the first exemplary embodiment in such a way that at least three retroreflectors of the object are irradiated simultaneously. The evaluation unit can be configured to determine a center point of the three measurement channel groups in the frequency spectrum in each case and determine an approximate 3D point of the object therefrom. This approximate 3D point can be used for object tracking. Tracking the object can be implemented in simple fashion since only an approximate determination of the position and tracking of same are necessary when an expanded beam is used. Further, tracking can be implemented quickly as a result of the parallel measurement. A tracking frequency can correspond to a readout frequency of the LIDAR unit, for example 1 to 10 kHz. Since tracking by way of the LIDAR signals is possible, it is possible to dispense with an additional tracking unit.

In a second exemplary embodiment, the first beam splitter can be configured to divide the input light beam among the three measurement channels in parallel. In respect of the second exemplary embodiment, reference can be made to the description of the first exemplary embodiment. By way of example, the input light beam of the LIDAR unit can be divided into the at least three measurement channels by way of a parallel multiplexer and can be input coupled into the optical fibers, which are characterized by the individual length offset. In the second exemplary embodiment, a second beam splitter, for example a sequential multiplexer, can be arranged in each measurement channel at the respective fiber end. Further, each measurement channel can have a plurality of mirrors, in particular deflection mirrors. The mirrors in a measurement channel are in each case configured to steer a light beam, which was deflected from the optical fiber to the mirror, onto exactly one retroreflector. Consequently, a mirror can be assigned to a retroreflector in one measurement channel. The second beam splitter can deflect the light beam, which propagates through the optical fiber of the respective measurement channel, onto at least three adjustable mirrors in sequence, wherein the mirrors of all measurement channels assigned to one retroreflector can be actuated and/or set simultaneously, i.e., in synchronized fashion. Hence, an individual retroreflector can be illuminated simultaneously by way of all measurement channels. The respective retroreflector can send back some of the beam incident thereon. The reflected light beam can propagate back through the optical unit, which consequently becomes an input coupling optical unit into the fiber, and back through the first beam splitter, which consequently leads to a superposition of all reflected beams of the measurement channels. The LIDAR unit can be configured to superpose a reference light beam, in particular a current input light beam, on the superposed beams such that interferences arise. A beat signal can arise in this exemplary embodiment, the frequency spectrum of the said beat signal including at least three relevant peaks, which includes the information items of a 3D point, and which includes the 6D information item by way of at least three different 3D points determined in this manner. In respect of the evaluation, reference can be made to the description of the first exemplary embodiment. This exemplary embodiment can be particularly advantageous since a simple separation of the peaks is possible and an evaluation is therefore simplified. This second exemplary embodiment allows a determination of 6D information items with an improved accuracy and less complexity. The measurement accuracy only depends directly on the accuracy of the LIDAR unit, which can be particularly insensitive to noise.

In this exemplary embodiment, the apparatus can be configured to track individual retroreflectors. The apparatus can be configured to carry out an independent tracking measurement for each measurement channel and each individual retroreflector. The tracking frequency can be determined by the readout frequency of the LIDAR unit divided by the number of measurement channels, for example 0.3 to 10 kHz.

In a third exemplary embodiment, the first beam splitter can be configured to divide the input light beam among the three measurement channels in sequence. In respect of the third exemplary embodiment, reference can be largely made to the description of the first and second exemplary embodiments. In the third exemplary embodiment, the LIDAR unit can be configured to sequentially impinge the measurement channels with the input light beam by way of a sequential multiplexer and input couple said input light beam into the respective optical fiber, which is characterized by the individual length offset. A second beam splitter, for example a sequential multiplexer, can be arranged in each measurement channel at the respective fiber end. Further, each measurement channel can have a plurality of mirrors, in particular deflection mirrors. The mirrors in a measurement channel are in each case configured to steer a light beam, which was deflected from the optical fiber to the mirror, onto exactly one retroreflector. Consequently, a mirror can be assigned to a retroreflector in one measurement channel. By way of the sequential multiplexer, the input light beam, at the fiber end, can be deflected onto a mirror between two channel switches of the first sequential beam splitter such that an individual retroreflector is illuminated. The respective retroreflector can send back some of the beam incident thereon. The reflected light beam can propagate back through the optical unit, which consequently becomes an input coupling optical unit into the optical fiber, and back through the first beam splitter, which consequently leads to a superposition of all reflected beams of the measurement channels. The LIDAR unit can be configured to superpose a reference light beam, in particular a current input light beam, on the superposed beams such that interferences arise. A beat signal can arise in this exemplary embodiment, the frequency spectrum of which has at least one relevant peak which includes a partial information item about a 3D point. The 6D information can be determined by way of at least nine different partial information items. In respect of the evaluation, reference can be made to the description of the first exemplary embodiment. This exemplary embodiment can be particularly advantageous since a simple separation of the peaks is possible and an evaluation is therefore simplified. This third exemplary embodiment allows a determination of 6D information items with an improved accuracy and less complexity. The measurement accuracy only depends directly on the accuracy of the LIDAR unit, which can be particularly insensitive to noise.

In this exemplary embodiment, the apparatus can be configured to track individual retroreflectors. The apparatus can be configured to carry out an independent tracking measurement for each measurement channel and each individual retroreflector. The tracking frequency can be determined by the readout frequency of the LIDAR unit divided by the number of measurement channels and the number of tracked retroreflectors, for example 0.1 to 1 kHz.

In a fourth exemplary embodiment, the first beam splitter can be configured to divide the input light beam among the three measurement channels in parallel. In respect of the fourth exemplary embodiment, reference can be largely made to the description of the first, second and third exemplary embodiment. The LIDAR unit can be configured to simultaneously impinge the measurement channels with the input light beam by way of a parallel multiplexer and input couple said input light beam into the respective optical fiber, which is characterized by the individual length offset. A second beam splitter, for example a further parallel multiplexer, can be arranged in each measurement channel at the respective fiber end. Further, each measurement channel can have a plurality of mirrors, in particular deflection mirrors. The mirrors in a measurement channel are in each case configured to steer a light beam, which was deflected from the optical fiber to the mirror, onto exactly one retroreflector. Consequently, a mirror can be assigned to a retroreflector in one measurement channel. By way of the second beam splitter, the input light beam, at the fiber end in each measurement channel, can be deflected onto at least three mirrors per measurement channel in parallel such that all retroreflectors are illuminated simultaneously. The respective retroreflector can send back some of the beam incident thereon. The reflected light beam can propagate back through the optical unit, which consequently becomes an input coupling optical unit into the optical fiber, and back through the first beam splitter, which consequently leads to a superposition of all reflected beams of the measurement channels. The LIDAR unit can be configured to superpose a reference light beam, in particular a current input light beam, on the superposed beams such that interferences arise. A beat signal can arise in this exemplary embodiment, the frequency spectrum of which includes at least nine relevant peaks, from which the 6D information items are determined. In respect of the evaluation, reference can be made to the description of the first exemplary embodiment. This exemplary embodiment can be particularly advantageous since a simple separation of the peaks is possible and an evaluation is therefore simplified. This fourth exemplary embodiment allows a determination of 6D information items with an improved accuracy and less complexity. The measurement accuracy only depends directly on the accuracy of the LIDAR unit, which can be particularly insensitive to noise.

In this exemplary embodiment, the apparatus can be configured to track individual retroreflectors. The apparatus can be configured to carry out an independent tracking measurement for each measurement channel and each individual retroreflector. The tracking frequency can be determined by the readout frequency of the LIDAR unit.

In a fifth exemplary embodiment, the first beam splitter can be configured to divide the input light beam among the three measurement channels in parallel. In respect of the fifth exemplary embodiment, reference can be largely made to the description of the first, second, third and fourth exemplary embodiments. The LIDAR unit can be configured to simultaneously impinge the measurement channels with the input light beam by way of a parallel multiplexer and input couple said input light beam into the respective optical fiber, which is characterized by the individual length offset. Further, each measurement channel can have at least one mirror, in particular a deflection mirror, which can be operated in scanning fashion in this exemplary embodiment. "Operated in scanning fashion" can be understood to mean that the mirror orientation is changed continuously or non-continuously. The mirror can be set in such a way that the mirror adopts different angle positions. The measurement channels can each have the at least one optical unit, which is configured that a light beam sweeps over a solid angle over time by way of a laser line or laser raster scan and/or to respectively focus on at least one of the retroreflectors in tracking fashion. The measurement channels can each have the at least one optical unit that is configured to expand the input light beam into a laser line such that a solid angle region is swept by the laser line during a scanning operation of the mirror, i.e., during a movement process of the laser line of the input light beam, a so-called laser line scan, at least three retroreflectors being situated in said solid angle region, for example by way of a linear or rotational movement of the laser line. By way of example, the measurement channels can each have a wide-angle lens. The optical unit can have at least one converging lens or a concave lens. Use can typically be made of a converging lens. All retroreflectors that were swept over at a certain time can send back some of the beam incident thereon. The reflected light beam can propagate back through the optical unit, which consequently becomes an input coupling optical unit into the optical fiber, and back through the first beam splitter, which consequently leads to a superposition of all reflected beams of the measurement channels. The LIDAR unit can be configured to superpose a reference light beam, in particular a current input light beam, on the superposed beams such that interferences arise. A beat signal can arise in this exemplary embodiment, the frequency spectrum of which, integrated over a laser line scan in time, includes at least nine relevant peaks, from which the 6D information items are determined. In respect of the evaluation, reference can be made to the description of the first exemplary embodiment. This fifth exemplary embodiment allows a determination of 6D information items with an improved accuracy and less complexity. The measurement accuracy only depends directly on the accuracy of the LIDAR unit, which can be particularly insensitive to noise. Furthermore, changing at least one retroreflector on the object can be very simple as no individual retroreflectors are illuminated; instead, at least three retroreflectors are irradiated when sweeping over the solid angle region.

In this exemplary embodiment, the apparatus can be configured to track the object. As explained above, an expanded light beam can be used in the fifth exemplary embodiment in such a way that at least three retroreflectors of the object are irradiated by the laser line when sweeping over the solid angle region. The evaluation unit can be configured to determine a center point of the three measurement channel groups in the frequency spectrum in each case and determine an approximate 3D point of the object therefrom. This approximate 3D point can be used for object tracking. Tracking the object can be implemented in simple fashion since only an approximate determination of the position and tracking of same are necessary when an expanded beam is used. Further, tracking can be implemented quickly as a result of the parallel measurement. The tracking frequency can correspond to the readout frequency of the LIDAR unit, for example 1 to 10 kHz; in particular, the duration of sweeping over the solid angle range with the laser line additionally sets the tracking frequency. Since tracking by way of the LIDAR signals is possible, it is possible to dispense with an additional tracking unit.

In a sixth exemplary embodiment, the first beam splitter can be configured to divide the input light beam among the three measurement channels in parallel. The LIDAR unit can be configured to simultaneously impinge the measurement channels with the input light beam by way of a parallel multiplexer and input couple said input light beam into the respective optical fiber, which is characterized by the individual length offset. Further, each measurement channel can have at least one mirror, in particular a deflection mirror, which can be operated in scanning fashion in this exemplary embodiment. The mirror can be set in such a way that the mirror adopts different angle positions. The measurement channels can each have at least one optical unit which is configured to radiate a light beam into a given solid angle such that, during scanning operation of the mirror, i.e., during a movement process of the laser beam, in which one or more, contiguous or non-contiguous solid angle regions are scanned line-by-line or column-by-column, a so-called laser raster scan, at least three retroreflectors are swept over. By way of example, the measurement channels can each have a wide-angle lens. The optical unit can have at least one converging lens or a concave lens. Use can typically be made of a converging lens. All retroreflectors that were swept over at a certain time can send back some of the beam incident thereon. The reflected light beam can propagate back through the optical unit, which consequently becomes an input coupling optical unit into the optical fiber, and back through the first beam splitter, which consequently leads to a superposition of all reflected beams of the measurement channels. The LIDAR unit can be configured to superpose a reference light beam, in particular a current input light beam, on the superposed beams such that interferences arise. A beat signal can arise in this exemplary embodiment, the frequency spectrum of which, integrated over a laser raster scan in time, includes at least nine relevant peaks, from which the 6D information items are determined. In respect of the evaluation, reference can be made to the description of the first exemplary embodiment. This exemplary embodiment allows a determination of 6D information items with an improved accuracy and less complexity. The measurement accuracy only depends directly on the accuracy of the LIDAR unit, which can be particularly insensitive to noise. Furthermore, changing at least one retroreflector on the object can be very simple as no individual retroreflectors are illuminated; instead, at least three retroreflectors are irradiated when sweeping over the solid angle region.

In this exemplary embodiment, the apparatus can be configured to track the object. As explained above, a light beam can be used in the fifth exemplary embodiment in such a way that at least three retroreflectors of the object are irradiated by the laser beam when sweeping over the solid angle region. The evaluation unit can be configured to determine a center point of the three measurement channel groups in the frequency spectrum in each case and determine an approximate 3D point of the object therefrom. This approximate 3D point can be used for object tracking. Tracking the object can be implemented in simple fashion since only an approximate determination of the position and tracking of same are necessary when an expanded beam is used. Further, tracking can be implemented quickly as a result of the parallel measurement. The tracking frequency can correspond to the readout frequency of the LIDAR unit, for example 1 to 10 kHz; in particular, the duration of sweeping over the solid angle range with the laser beam additionally sets the tracking frequency. Since tracking by way of the LIDAR signals is possible, it is possible to dispense with an additional tracking unit.

Embodiments without a length offset are also conceivable. By way of example, the apparatus can have at least one sensor element for each measurement channel, the sensor element of the respective measurement channel being independent of the sensor elements of the other measurement channels. Here, "independent" can be understood to mean that the sensor element only detects output signals of its measurement channel but not of the other measurement channels. By way of example, the first measurement channel can have a first sensor element, the second measurement channel can have a second sensor element and the third measurement channel can have a third sensor element. The first sensor element can be configured to detect the output signals of the first measurement channel. The second sensor element can be configured to detect the output signals of the second measurement channel. The third sensor element can be configured to detect the output signals of the third measurement channel. An input light beam of the illumination device can be separated by way of a beam splitter, for example the first beam splitter, in particular a parallel multiplexer, into the at least three measurement channels in optical fibers. At least one deflection mirror with an adjustable deflection angle can be arranged at the fiber end, said deflection mirror expanding the input light beam into a solid angle such that at least three retroreflectors are irradiated by way of an optical unit, in particular a zoom optical unit, including the at least one first optical element and/or the at least one optical unit. Each of the retroreflectors can send back at least some of the beam incident thereon. The reflected light beams can pass backward through the optical unit, said optical unit becoming an input coupling optical unit into the respective fiber. Each of the measurement channels can have at least one further beam splitter, which is configured to guide the reflected light beams of the measurement channel onto the at least one sensor element of the measurement channel. For each measurement channel, the first beam splitter can be configured to guide an input light beam onto the sensor element of the respective measurement channel. In the LIDAR unit, the input light beam of the three measurement channels can interfere with the current output signal of the respective measurement channel on the respective sensor element. A beat signal can arise for each of the three measurement channels, the frequency spectrum of which beat signal has a plurality of peaks. The evaluation unit can be configured to determine the frequency spectrum for each measurement channel. The evaluation unit can be configured to determine a frequency spectrum of the LIDAR signal, in particular the beat signal, by a Fourier transform. The measurement channels can each be assigned to a sensor element. The evaluation unit can be configured to identify the peaks in the respective frequency spectrum. The evaluation unit can be configured to determine a spatial position of the three retroreflectors by evaluating the peak distribution and/or arrangement of the peaks. A complete 6D information item can be determined in the case of a known arrangement of the retroreflectors on the object.

In a further aspect, a method for determining at least one spatial position and orientation of at least one object with at least three retroreflectors is provided. An apparatus with at least one LIDAR unit with at least three measurement channels according to any one of the preceding exemplary embodiments is used in the method. In the method, at least one frequency modulated input light beam is produced by an illumination device of the LIDAR unit. The input light beam is divided among the measurement channels in parallel and/or in sequence by at least one first beam splitter. At least one measurement signal is produced by the measurement channels in each case. At least one LIDAR signal is produced by the LIDAR unit for the measurement signals. The spatial position and orientation of the object is determined from the LIDAR signal by at least one evaluation unit.

In this case, the method steps can be carried out in the order specified, wherein one or more of the steps can at least partly also be carried out simultaneously and wherein one or more of the steps can be multiply repeated. In particular, the method may include at least one tracking method, in which the method steps are at least partly carried out repeatedly. At least partial repetition can be understood to mean that, in the tracking method, not all method steps of the method are completely repeated and/or individual method steps are carried out repeatedly, whereas other method steps are not carried out repeatedly. Furthermore, further steps can additionally be performed independently of whether or not they are mentioned in the present application. For details in respect of the method according to the exemplary embodiment of the invention, reference is made to the description of the apparatus according to the exemplary embodiments of the invention.

The method may include a calibration method. At least one frequency spectrum can be determined in the calibration method for at least one retroreflector with a known spatial position. In the calibration method, at least three peaks can be determined in the frequency spectrum and can be calibrated with a known spatial position of the retroreflector.

In summary, in the context of the present invention, the following exemplary embodiments are provided:

Exemplary embodiment 1: An apparatus for determining at least one spatial position and orientation of at least one object with at least three retroreflectors, wherein the apparatus has at least one LIDAR unit with at least three measurement channels, wherein the LIDAR unit has at least one illumination device, which is configured to produce at least one frequency modulated input light beam, wherein the LIDAR unit has at least one first beam splitter, wherein the first beam splitter is configured to divide the input light beam among the measurement channels in parallel and/or in sequence, wherein the measurement channels are each configured to produce at least one measurement signal, wherein the LIDAR unit is configured to produce at least one LIDAR signal for the measurement signals, wherein the apparatus has at least one evaluation unit, which is configured to determine the spatial position and orientation of the object from the LIDAR signal.

Exemplary embodiment 2: The apparatus according to the preceding exemplary embodiment, wherein the LIDAR unit is configured to operate the measurement channels in parallel and/or in sequence.

Exemplary embodiment 3: The apparatus according to one of the preceding exemplary embodiments, wherein the measurement channels are configured at least partly separated from one another in space and/or time.

Exemplary embodiment 4: The apparatus according to any one of the preceding exemplary embodiments, wherein the illumination device has at least one light source.

Exemplary embodiment 5: The apparatus according to any one of the preceding exemplary embodiments, wherein the illumination device has at least one adjustable (tunable) laser source.

Exemplary embodiment 6: The apparatus according to any one of the preceding exemplary embodiments, wherein the measurement channels each have at least one static or adjustable mirror.

Exemplary embodiment 7: The apparatus according to any one of the preceding exemplary embodiments, wherein the measurement channels each have at least one optical fiber.

Exemplary embodiment 8: The apparatus according to the preceding exemplary embodiment, wherein the optical fibers each have a length offset.

Exemplary embodiment 9: The apparatus according to either of the two preceding exemplary embodiments, wherein the measurement channels each have at least one first optical element, wherein the first optical element is configured to output couple the input light beam passing through the respective optical fiber out of the optical fiber and input couple a light beam reflected by at least one retroreflector into the respective optical fiber.

Exemplary embodiment 10: The apparatus according to any one of the preceding exemplary embodiments, wherein the apparatus has at least one sensor element for each measurement channel, the sensor element of the respective measurement channel being independent of the sensor elements of the other measurement channels.

Exemplary embodiment 11: The apparatus according to any one of the preceding exemplary embodiments, wherein the measurement channels each have at least one optical unit, which is configured to expand a light beam into a solid angle such that the at least three retroreflectors are irradiated.

Exemplary embodiment 12: The apparatus according to any one of the preceding exemplary embodiments, wherein the measurement channels each have the at least one optical unit, which is configured that a light beam sweeps over a solid angle over time by way of a laser line or laser raster scan and/or to respectively focus on at least one of the retroreflectors in tracking fashion.

Exemplary embodiment 13: The apparatus according to any one of the preceding exemplary embodiments, wherein the LIDAR unit is configured to superpose a reference light beam on at least one measurement signal and determine a frequency spectrum of an arising beat signal.

Exemplary embodiment 14: The apparatus according to the preceding exemplary embodiment, wherein the first beam splitter is configured to superpose the measurement signals of the three measurement channels, wherein the LIDAR unit is configured to superpose a reference light beam on the superposed measurement signals and determine a frequency spectrum of an arising beat signal.

Exemplary embodiment 15: The apparatus according to either of the two preceding exemplary embodiments, wherein the LIDAR unit is configured to determine at least three peaks in the frequency spectrum for each retroreflector and determine the spatial position and orientation of the object therefrom.

Exemplary embodiment 16: The apparatus according to any one of the preceding exemplary embodiments, wherein the measurement channels each have at least one second beam splitter, wherein the second beam splitter is arranged downstream of the respective optical fiber of the measurement channel in the propagation direction of the input light beam, wherein the second beam splitter is configured to provide the input light beam in parallel and/or in sequence for the purposes of illuminating at least one of the retroreflectors.

Exemplary embodiment 17: A method for determining at least one spatial position and orientation of at least one object with at least three retroreflectors, wherein an apparatus with at least one LIDAR unit with at least three measurement channels according to any one of the preceding exemplary embodiments is used, wherein at least one frequency modulated input light beam is produced by an illumination device of the LIDAR unit, wherein the input light beam is divided among the measurement channels in parallel and/or in sequence by at least one first beam splitter, wherein at least one measurement signal is produced by the measurement channels in each case, wherein at least one LIDAR signal is produced by the LIDAR unit for the measurement signals, and wherein the spatial position and orientation of the object is determined from the LIDAR signal by at least one evaluation unit.

Exemplary embodiment 18: The method according to the preceding exemplary embodiment, wherein the method includes a calibration method, wherein at least one frequency spectrum is determined in the calibration method for at least one retroreflector with a known spatial position, and wherein at least three peaks are determined in the frequency spectrum and calibrated by the known spatial position of the retroreflector.

BRIEF DESCRIPTION OF THE DRAWINGS

The invention will now be described with reference to the drawings wherein:

FIGS. 9A to 9C show exemplary measurement signals on the sensor elements.

DESCRIPTION OF EXEMPLARY EMBODIMENTS

Figure 1:
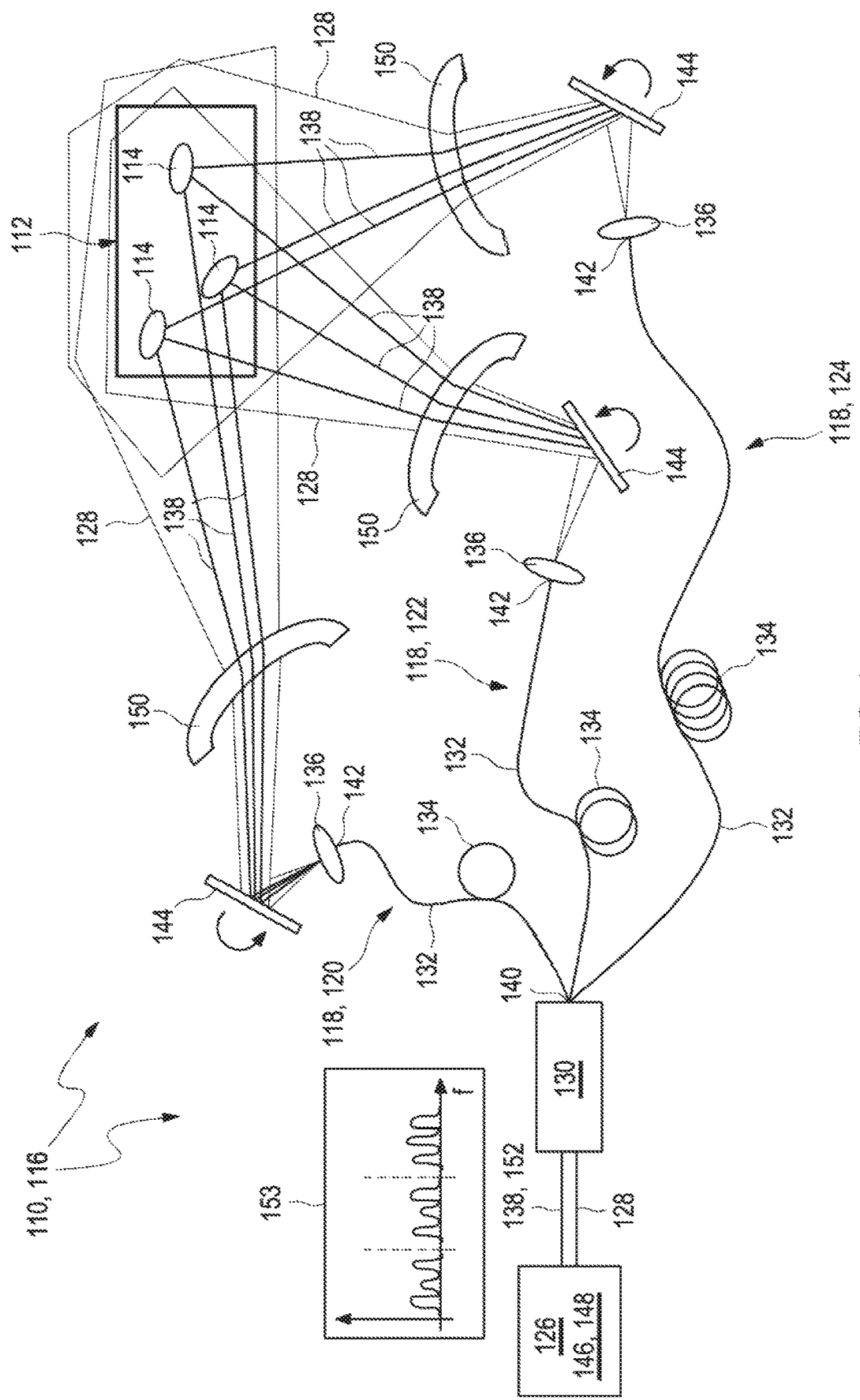
FIG. 1 shows a schematic illustration of an apparatus according to a first exemplary embodiment of the invention.

FIG. 1 shows a schematic illustration of an apparatus 110 for determining at least one spatial position and orientation of at least one object 112 with at least three retroreflectors 114 according to a first exemplary embodiment of the invention. By way of example, the object 112 can be a measuring head of a sensor or a tool, by which a component can be probed. By way of example, the retroreflector 114 can be a marker. By way of example, the retroreflectors 114 can be selected from the group consisting of: a cat's eye, spherical lenses with a reflection layer, a marker as described in US 2011/0007326 A1, US 2013/0050410 A1, or US 2017/0258531 A1, the content of which is herewith incorporated by reference into this application, a cube prism, and a corner cube. The retroreflectors 114 can be arranged on the object 112 in a secured and/or interchangeable fashion. A position of the retroreflectors 114 on the object 112 can be known. The object 112 may have a plurality of retroreflectors 114, in particular more than three retroreflectors 114, for example four, five, six or more retroreflectors 114.

The apparatus 110 has at least one LIDAR unit 116 with at least three measurement channels 118. The measurement channels 118 can be configured identically or differently. The LIDAR unit 116 can have a plurality of measurement channels 118, for example four, five or more measurement channels. The measurement channels 118 can be configured at least partly separated from one another in space and/or time. In the exemplary embodiment shown in FIG. 1, the apparatus has three measurement channels 118, namely a first measurement channel 120, a second measurement channel 122 and a third measurement channel 124.

The LIDAR unit 116 has at least one illumination device 126, which is configured to produce at least one frequency modulated input light beam 128. The LIDAR unit 116 can be configured to produce the input light beam 128, the frequency of which is tuned continuously, according to the FMCW method. By way of example, the frequency of the input light beam 128 can be linearly modulated with time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit 116 can be configured like in U.S. Pat. Nos. 9,559,486 B2, 8,913,636 B2, or 2016/123718 A1.

The illumination device 126 can have at least one light source. The illumination device 126 can have at least one FMCW light source. The illumination device 126 can have at least one adjustable (tunable) laser source, for example at least one distributed feedback (DFB) laser diode or a distributed Bragg reflector (DBR) laser diode.

The LIDAR unit 116 has at least one first beam splitter 130. The first beam splitter 130 is configured to divide the input light beam 128 among the measurement channels 118 in parallel and/or in sequence. In the exemplary embodiment shown in FIG. 1, the LIDAR unit 116 can be configured to operate the measurement channels 118 in parallel. In the case of a parallel operation, a measurement of a plurality of distances at the same time can be facilitated. The first beam splitter 130 can have at least one multiplexer. The first beam splitter 130 can be arranged upstream of the respective optical fiber 132 of the measurement channel 118 in the propagation direction of the input light beam 128.

The measurement channels 118 can each have at least one optical fiber 132, in particular at least one monomode fiber and/or at least one multimode fiber. Typically, these optical fibers 132 can have different lengths. This can facilitate the separation of the respective measurement channels in a frequency spectrum, as described below. The optical fibers 132 can each have a length offset 134. The length offset 134 of the optical fibers 132 can be such that respective frequency spectra of the measurement channels 118 are identifiable and/or separable in a frequency spectrum.

The measurement channels 118 can each have at least one first optical element 136. The first optical element 136 can be configured to output couple the input light 128 beam passing through the respective optical fiber 132 out of the optical fiber 132 and input couple a light beam 138 reflected by at least one retroreflector 114 into the respective optical fiber 132. The optical fibers 132 can have a fiber beginning 140 and a fiber end 142, wherein at least one portion of the input light beam 128 passes through the respective optical fiber 132 from fiber beginning 140 to fiber end 142. The first optical element 136 can be arranged at the fiber end 142. The optical element 136 can include an output coupling optical unit. The optical element 136 can include an input coupling optical unit. The output coupling optical unit and the input coupling optical unit can be identical.

The measurement channels 118 can each have at least one static or adjustable mirror 144. By way of example, the apparatus 110 can have at least one controller, which is configured to actuate the mirror 144 and set the latter into any angle position.

The measurement channels 118 are each configured to produce at least one measurement signal. The LIDAR unit 116 can have at least one sensor element 146, which is configured to detect the measurement signals of the measurement channels 118. The sensor element can have at least one photodiode.

The LIDAR unit 116 is configured to produce at least one LIDAR signal for each measurement channel 118. The LIDAR unit 116 can be configured to produce a reference light beam. The LIDAR unit 116 can have at least one reference arm. The reference light beam can be a current input light beam 128 which is supplied to the sensor element 146 via the reference arm of the LIDAR unit 116, for example. The sensor element 146 can be configured to superpose the measurement signals of the measurement channels 118 on the reference light beam. The LIDAR signal can be a signal in which the reference light beam is superposed on the measurement signals of the measurement channel 118. The LIDAR signal can be a beat signal. The LIDAR unit 116 can be configured to superpose the reference light beam on at least one measurement signal and determine a frequency spectrum of an arising beat signal. The first beam splitter 130 can be configured to superpose the measurement signals, in particular output light beams, of the three measurement channels 118. The LIDAR unit 116 can be configured to superpose the reference light beam on the superposed measurement signals and determine a frequency spectrum of an arising beat signal. The LIDAR unit 116 can be configured to determine at least three peaks in the frequency spectrum for each retroreflector 114 and determine the spatial position and orientation of the object 112 therefrom.

The apparatus 110 has at least one evaluation unit 148, which is configured to determine the spatial position and orientation of the object 112 from the LIDAR signal. The evaluation unit 148 can include for example at least one data processing apparatus, for example at least one computer or microcontroller. The data processing apparatus can have one or more volatile and/or non-volatile data memories, wherein the data processing apparatus can be configured for example in terms of programming to drive the sensor element 146. The evaluation unit 148 can furthermore include at least one interface, for example an electronic interface and/or a human-machine interface such as, for example, an input/output apparatus such as a display and/or a keyboard. The evaluation unit 148 can be constructed for example centrally or else in a decentralized manner. Other configurations are also conceivable. The evaluation unit 148 can have at least one A/D converter.

The evaluation unit 148 is configured to determine the spatial position and orientation of the object 112 from the LIDAR signal. The evaluation unit 148 can be configured to determine a frequency spectrum of the LIDAR signal, in particular the beat signal, by a Fourier transform. The frequency spectrum can have a plurality of maximums, so-called peaks. The evaluation unit 148 can be configured to identify the peaks in the frequency spectrum. By way of example, the evaluation unit 148 can be configured to identify at least nine peaks in the case of a parallel measurement in the three measurement channels. The evaluation unit 148 can be configured to assign the peaks to a measurement channel in each case. By way of example, in the case of a parallel measurement with three measurement channels, the evaluation unit 148 can be configured to assign the nine identified peaks to 3×3 groups, which are also referred to as measurement channel groups. A spatial position of the three retroreflectors can be determined from the information items about the exact distribution and/or arrangement of the peaks in the individual groups. A 3D point can be determined from three lengths in different directions. A complete 6D information item can be determined in the case of a known arrangement of the retroreflectors on the object 112.

The evaluation unit 148 can be configured to carry out a calibration method. The evaluation unit 148 can be configured to calibrate a fit function. At least one frequency spectrum can be determined in the calibration method for at least one retroreflector 114 with a known spatial position. The evaluation unit 148 can be configured to determine at least three peaks in the frequency spectrum and calibrate these with a known spatial position of the retroreflector 114. Here, this fit function can have a 3D polynomial for each measurement channel 118, for example, wherein the three (x, y, z)-coordinates of the known 3D point are mapped onto the frequency position in the respective channel. The fit function can have at least three such 3D polynomials since use is made of at least three measurement channels 118. The three (x, y, z)-coordinates of the known 3D point can be calculated back from the at least 3 measurement channel signals by the numerical inversion of this function. Here, this invertibility is guaranteed by virtue of it not being possible to map any two 3D points onto the same frequency positions in the spectrum as a result of the geometric arrangement of the measurement channels.

By way of example, the evaluation unit 148 can be configured to fit the frequency spectrum with an empirically or semi-empirically determined and/or determinable function under the assumption of a known position of the retroreflectors on the object and thus determine the 6D information items. A last-known position of the retroreflectors can be used as an initial value. In particular, this is implemented by virtue of, as a result of at least three retroreflectors 114 and at least three measurement channels 118, at least 9 peaks arising in the frequency spectrum of the LIDAR signal, which lead by the simple separation into the three measurement channel groups 168 to at least $3^3=27$ expedient 3-peak-tuples and, as a result thereof, 27 possible 3D positions, so-called candidates, are found. Here, the correct 3D positions can be selected by calculating the distances, e.g., the Euclidean distances, between all 3-subsets of the 27 candidates to the last found value, the so-called start value. Here, this 3-subset with the smallest summed distances from the start value may contain the suggestion for the correct 3 3D points which have the 6D information item. In particular, the geometric arrangement of the markers on the measuring head can also be taken into account as validity criterion in this selection, as can, also, the predictions for the 3D points that arise from the temporal change of the 6D information items at earlier times, taking account of the expected inertia of the movement of the measuring head.

As explained above, the first beam splitter 130 can be configured to divide the input light beam 128 among the three measurement channels 118 in parallel in the exemplary embodiment shown in FIG. 1. By way of example, the input light beam 128 of the LIDAR unit 116 can be divided into the at least three measurement channels 118 by way of a parallel multiplexer and can be input coupled into the optical fibers 132. The at least one mirror 144, in particular a deflection mirror, can be arranged at the fiber end 142. The measurement channels can each have at least one optical unit 150, which is configured to expand a light beam into a solid angle such that the at least three retroreflectors 114 are irradiated. By way of example, the measurement channels 118 can each have a wide-angle lens. The optical unit 150 can have at least one converging lens or a concave lens. Typically, use can be made of a converging lens, which facilitates an approximately tilted plane wave front at the retroreflector 114 and good efficiency during the input coupling at the focus. Each retroreflector 114 can send back some of the light beam incident thereon. The reflected light beams 138 can propagate in the measurement channels 118 back through the optical unit 150, which consequently becomes an input coupling optical unit into the optical fiber, and back through the first beam splitter 130, which consequently leads to a superposition of all reflected light beams 138. The LIDAR unit 116 can be configured to superpose a reference light beam, in particular a current input light beam, on the superposed beams 152 such that interferences arise. A beat signal can arise in this exemplary embodiment, the frequency spectrum of which has at least nine relevant peaks which have the 6D information items. A frequency spectrum 153 is illustrated in FIG. 1 in an exemplary fashion.

Figure 2A:
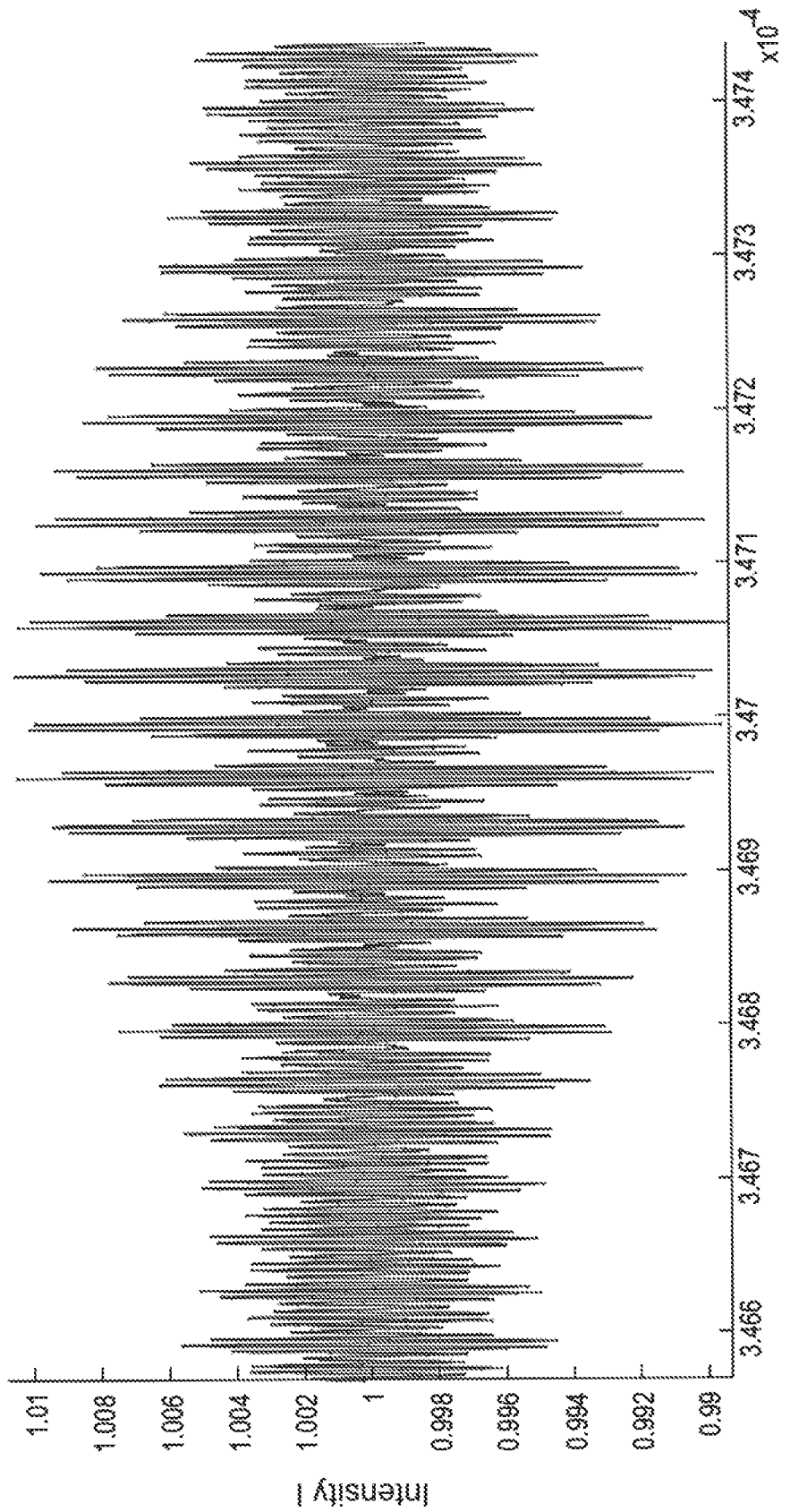
FIGS. 2A to 2C show the intensity I as a function of the time t for an exemplary beat signal, an associated frequency spectrum of the beat signal, and an adjusted frequency spectrum, respectively.
Figure 2B:
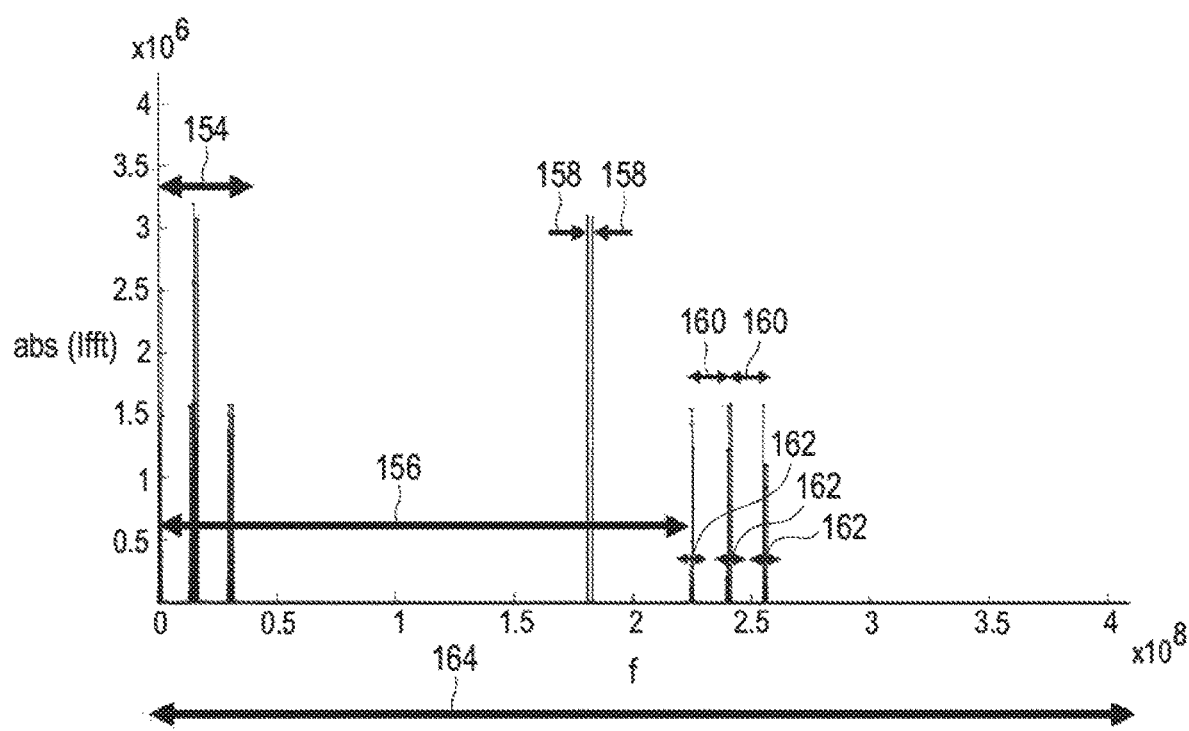

FIG. 2A shows the intensity I as a function of the time t for an exemplary beat signal. FIG. 2B shows the associated frequency spectrum of the beat signal, in particular the absolute value of the Fourier transformed intensity abs (Ifft) as a function of the frequency f. In the case of the parallel measurement in the three measurement channels 118, not only may interferences arise between the respective measurement signals and the reference signal, but interferences may also arise between the individual measurement signals in the case of the superposition of the measurement signals and the reference signal. FIG. 2B shows that the peaks as a result of interferences of the measurement signals are situated in a region 154 of the frequency spectrum. Consequently, the interferences as a result of the superposition of the measurement signals can be separated in the frequency spectrum from the interferences as a result of the superposition of the reference signal on the measurement signals by way of a suitable choice of design parameters. By way of example, at least one parameter, also referred to as design parameter, from the group consisting of: depth distances of the retroreflectors on the object, length offset of the optical fibers, length of a signal analysis time window, measurement volume depth, and sampling frequency of the A/D-converter can be selected in such a way that a separation of the peaks in the frequency spectrum is possible. The position of the interferences in the frequency spectrum of the individual measurement signals directly with one another depend on the depth distances of the retroreflectors 114 on the object 112 and the length offset of the optical fibers 132. A distance 156 in the frequency spectrum from the position of the interferences of the individual measurement signals directly with one another to a position of the interferences of the measurement signals with the reference signal can depend on the measurement volume depth and the respective length offset of the optical fibers 132. By way of example, a minimum offset can be chosen in such a way that there is no collision with measurement beam interferences in the case of the shortest distance to the sensor element 146. By way of example, a minimum offset can be 5 m. Further, a fineness or resolution, illustrated by arrows 158 in FIG. 2B, of the frequency spectrum may depend on a length of a signal analysis window. By way of example, the length of the signal analysis time window can be 1/1 kHz. Further, a distance 160 between the peaks of the interferences of the measurement signals with the reference signal between the individual measurement channel groups can depend on the length offset of the optical fibers 132. Further, a width 162 of the measurement channel groups can be set by path length differences of the various retroreflectors 114 in a measurement channel 118. The peak positions in the measurement channel groups are set by the frequency delta between reference light beam and measurement signal. A length 164 of the considered frequency spectrum can be defined by the sampling frequency of the A/D converter, for example 2 GHz. The apparatus is configured in such a way that a separation of the peaks as a result of interferences from superposing the respective measurement signals from the peaks as a result of interferences from superposing the reference light beam on the respective measurement signals is possible. The evaluation unit can be configured to separate the interferences from superposing the respective measurement signals from the interferences from superposing the respective measurement signals on the reference light beam. The evaluation unit can have at least one band-pass and/or high-pass filter.

Figure 2C:
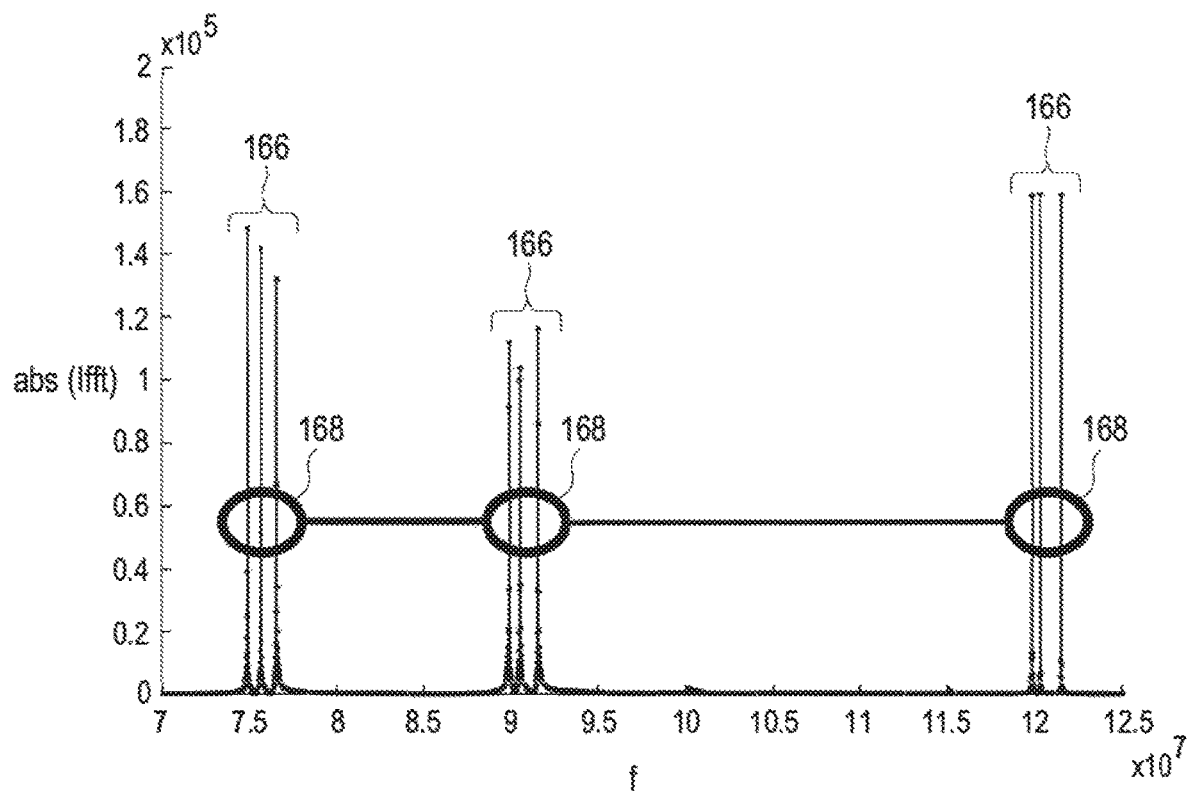

FIG. 2C shows a frequency spectrum from which the interferences by the superposition of the respective measurement signal on one another have been removed. The apparatus 110 can be configured to track the object 112. As explained above, an expanded light beam can be used in the exemplary embodiment shown in FIG. 1 in such a way that at least three retroreflectors 114 of the object 112 are irradiated simultaneously. The evaluation unit 148 can be configured to determine a center point 166 of the three measurement channel groups in the frequency spectrum in each case and determine an approximate 3D point of the object 112 therefrom. This approximate 3D point can be used for object tracking. Tracking the object 112 can be implemented in simple fashion since only an approximate determination of the position and tracking of same are necessary when an expanded beam is used. Further, tracking can be implemented quickly as a result of the parallel measurement. A tracking frequency can correspond to a readout frequency of the LIDAR unit 116, for example 1 to 10 kHz. Since tracking by way of the LIDAR signals is possible, it is possible to dispense with an additional tracking unit.

The apparatus 110 can be configured to carry out a calibration method for tracking the object 112. In the calibration method for tracking the object 112, angle positions of the three mirrors 144 can be determined for at least one distance between the LIDAR unit 116 and the object 112, said angle positions rendering it possible to be able to cover a predetermined volume of the object 112 with the expanded input light beam 128. While the object 112 is being tracked, the apparatus 110 can be controlled to these certain mirror angle positions.

Further, FIG. 2C shows the three identified measurement channel groups 168, which each have three sub-peaks that can be each assigned to a retroreflector 114. The information items about the precise distribution and/or arrangement of the sub-peaks in the three measurement channel groups 168 defines the precise position of three 3D points and therefore the complete 6D information item. The evaluation unit 148 can be configured to fit the frequency spectrum and determine the 6D information items. The evaluation unit 148 can be configured to divide the frequency spectrum with many peaks among the three measurement channel groups 168. Here, a respective retroreflector can always be arranged in one of these measurement channel groups 168 as a peak. The evaluation unit 148 can be configured to determine all possible 3D positions that emerge from these peaks. By way of example, three peaks in the three measurement channel groups may yield $3^3=27$ 3D positions. The evaluation unit 148 can be configured to determine three "best fit" 3D points for the retroreflectors 114 by a start value relating to the position of the retroreflectors 114, for example relating to last measurement time and a geometric arrangement of the retroreflectors 114.

Figure 3:
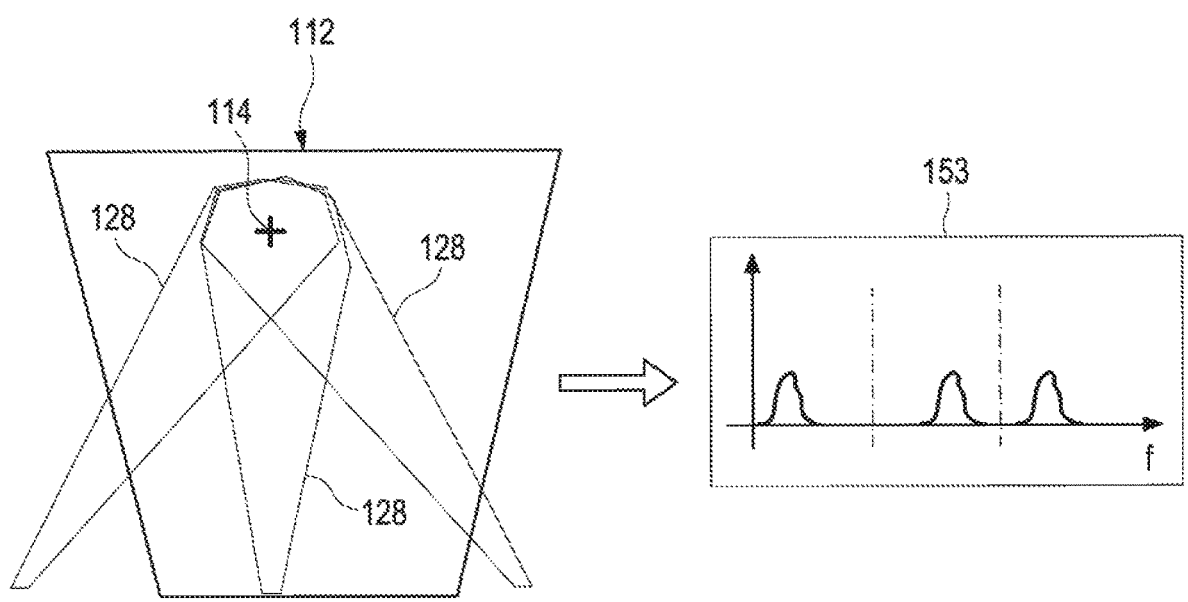
FIG. 3 shows a calibration method according to an exemplary embodiment of the invention.

The apparatus 110 can be configured to determine a start value, for example at the start of the measurement of a very large component. FIG. 3 shows an example of such a calibration method. To this end, a uniqueness of the position of the retroreflectors 114 in 3D space can be implemented by setting all retroreflectors 114 blind apart from one and by periodically rotating through this using other retroreflectors. A 3D point can be determined from three lengths in different directions. By way of example, peaks in the frequency spectrum can be fitted with a polynomial or any other fit function. A frequency spectrum 153 is illustrated in FIG. 3 in an exemplary fashion. Thus, a unique, good start orientation, i.e., start values for determining the 6D information, can be determined by a timestamp.

The LIDAR unit 116 can be configured to operate the measurement channels 118 in parallel and/or in sequence. FIGS. 4 to 7 show further examples of parallel and/or sequential operation of the measurement channels.

Figure 4:
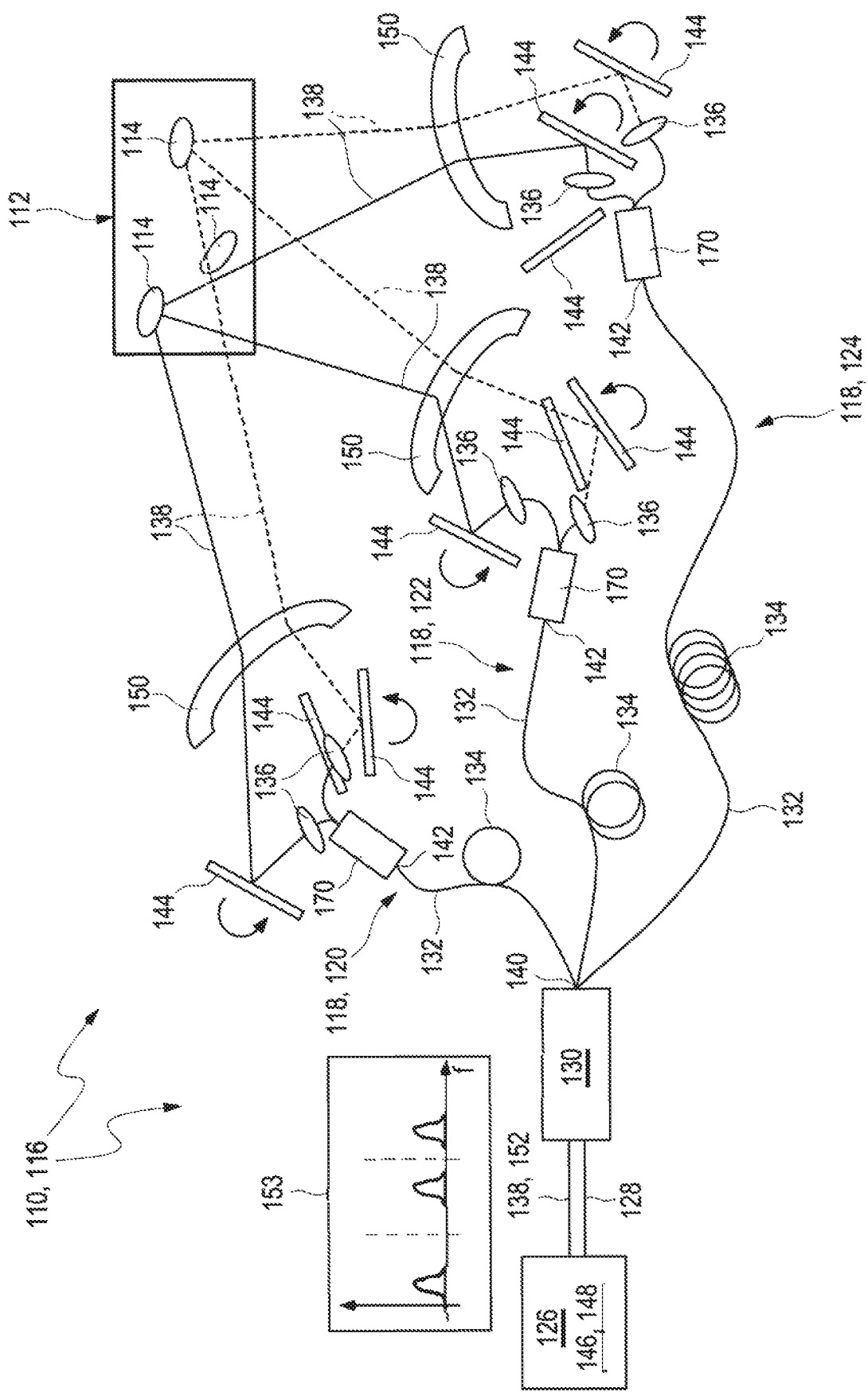
FIG. 4 shows a schematic illustration of an apparatus according to a second exemplary embodiment of the invention.

FIG. 4 shows a second exemplary embodiment. In respect of the second exemplary embodiment, reference can be largely made to the description of the first exemplary embodiment in FIGS. 1 to 3. Like in the first exemplary embodiment, the first beam splitter 130 can be configured to divide the input light beam 128 among the three measurement channels 118 in parallel in the second exemplary embodiment. By way of example, the input light beam 128 of the LIDAR unit 116 can be divided into the at least three measurement channels 118 by way of a parallel multiplexer and can be input coupled into the optical fibers, which are characterized by the individual length offset 134. In the exemplary embodiment shown in FIG. 4, the measurement channels 118 can each have at least one second beam splitter 170. The second beam splitter 170 can be arranged downstream of the respective optical fiber 132 of the measurement channel 118 in the propagation direction of the input light beam 128. The second beam splitter 170 can be configured to provide the input light beam 128 in parallel and/or in sequence for the purposes of illuminating at least one of the retroreflectors 114. In the exemplary embodiment shown in FIG. 4, a second beam splitter 170, for example a sequential multiplexer, can be arranged in each measurement channel 118 at the respective fiber end 142. Further, each measurement channel 118 can have a plurality of mirrors 144, in particular deflection mirrors. The mirrors 144 in a measurement channel 118 are in each case config-ured to steer a light beam, which was deflected from the optical fiber 132 to the mirror 144, onto exactly one retroreflector 114. Consequently, a mirror 144 can be assigned to a retroreflector 114 in one measurement channel 118. The second beam splitter 170 can deflect the light beam, which propagates through the optical fiber 132 of the respective measurement channel 118, onto at least three adjustable mirrors 144 in sequence, wherein the mirrors 144 of all measurement channels 118 assigned to one retroreflector 114 can be actuated and/or set simultaneously, i.e., in synchronized fashion. Hence, an individual retroreflector 114 can be illuminated simultaneously by way of all measurement channels 118. The respective retroreflector 114 can send back some of the beam incident thereon. The reflected light beam 138 can propagate back through the optical unit 150, which consequently becomes an input coupling optical unit into the optical fiber, and back through the first beam splitter 130, which consequently leads to a superposition of all reflected beams of the measurement channels 118. The LIDAR unit 116 can be configured to superpose a reference light beam, in particular a current input light beam 128, on the superposed beams such that interferences arise. A beat signal can arise in this exemplary embodiment, the frequency spectrum of the said beat signal including at least three relevant peaks, which include the information items of a 3D point and which includes the 6D information item by way of at least three different 3D points determined in this manner. A frequency spectrum 153 is illustrated in FIG. 4 in an exemplary fashion. In respect of the evaluation, reference can be made to the description of the first exemplary embodiment. This exemplary embodiment can be particularly advantageous since a simple separation of the peaks is possible and an evaluation is therefore simplified.

Figure 5:
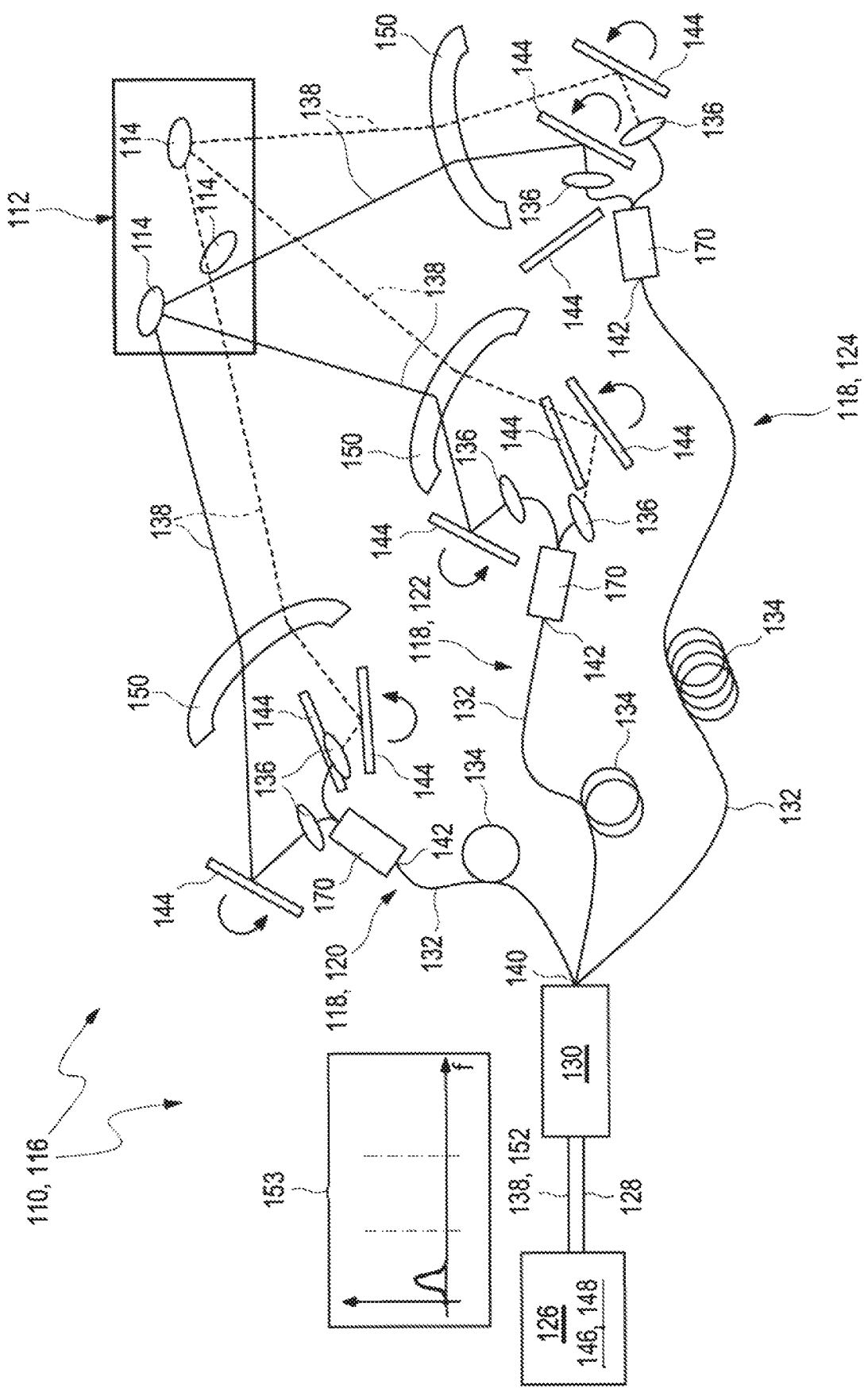
FIG. 5 shows a schematic illustration of an apparatus according to a third exemplary embodiment the invention.

In this exemplary embodiment, the apparatus 110 can be configured to track individual retroreflectors 114. The apparatus 110 can be configured to carry out an independent tracking measurement for each measurement channel 118 and each individual retroreflector 114. The tracking frequency can be determined by the readout frequency of the LIDAR unit 116 divided by the number of measurement channels 118, for example 0.3 to 10 kHz. FIG. 5 shows a third exemplary embodiment. In respect of the third exemplary embodiment, reference can be largely made to the description of the first and second exemplary embodiments in FIGS. 1 to 4. In the third exemplary embodiment, the first beam splitter 130 can be configured to divide the input light beam 128 among the three measurement channels 118 in sequence. The LIDAR unit 116 can be configured to sequentially impinge the measurement channels 118 with the input light beam 128 by way of a sequential multiplexer and input couple said input light beam into the respective optical fiber 132, which is characterized by the individual length offset 134. A second beam splitter 170, for example a sequential multiplexer, can be arranged in each measurement channel 118 at the respective fiber end 142. Further, each measurement channel 118 can have a plurality of mirrors 144, in particular deflection mirrors. The mirrors 144 in a measurement channel 118 are in each case configured to steer a light beam, which was deflected from the optical fiber 132 to the mirror 144, onto exactly one retroreflector 114. Consequently, a mirror 144 can be assigned to a retroreflector 114 in one measurement channel 118. By way of the sequential multiplexer, the input light beam 128, at the fiber end 142, can be deflected onto a mirror 144 between two channel switches of the first sequential beam splitter 130 such that an individual retroreflector 114 is illuminated. The respective retroreflector 114 can send back some of the beam incident thereon. The reflected light beam 138 can propagate back through the optical unit 150, which consequently becomes an input coupling optical unit into the optical fiber 132, and back through the first beam splitter 130, which consequently leads to a superposition of all reflected beams of the measurement channels. The LIDAR unit 116 can be configured to superpose a reference light beam, in particular a current input light beam 128, on the superposed beams such that interferences arise. A beat signal can arise in this exemplary embodiment, the frequency spectrum of which has at least one relevant peak which includes a partial information item about a 3D point. A frequency spectrum 153 is illustrated in FIG. 5 in an exemplary fashion. The 6D information can be determined by way of at least nine different partial information items determined thus. In respect of the evaluation, reference can be made to the description of the first exemplary embodiment. This exemplary embodiment can be particularly advantageous since a simple separation of the peaks is possible and an evaluation is therefore simplified. This third exemplary embodiment allows a determination of 6D information items with an improved accuracy and less complexity. The measurement accuracy only depends directly on the accuracy of the LIDAR unit, which can be particularly insensitive to noise.

In this exemplary embodiment, the apparatus 110 can be configured to track individual retroreflectors 114. The apparatus 110 can be configured to carry out an independent tracking measurement for each measurement channel 118 and each individual retroreflector 114. The tracking frequency can be determined by the readout frequency of the LIDAR unit 116 divided by the number of measurement channels 118 and the number of tracked retroreflectors 114, for example 0.1 to 1 kHz.

Figure 6:
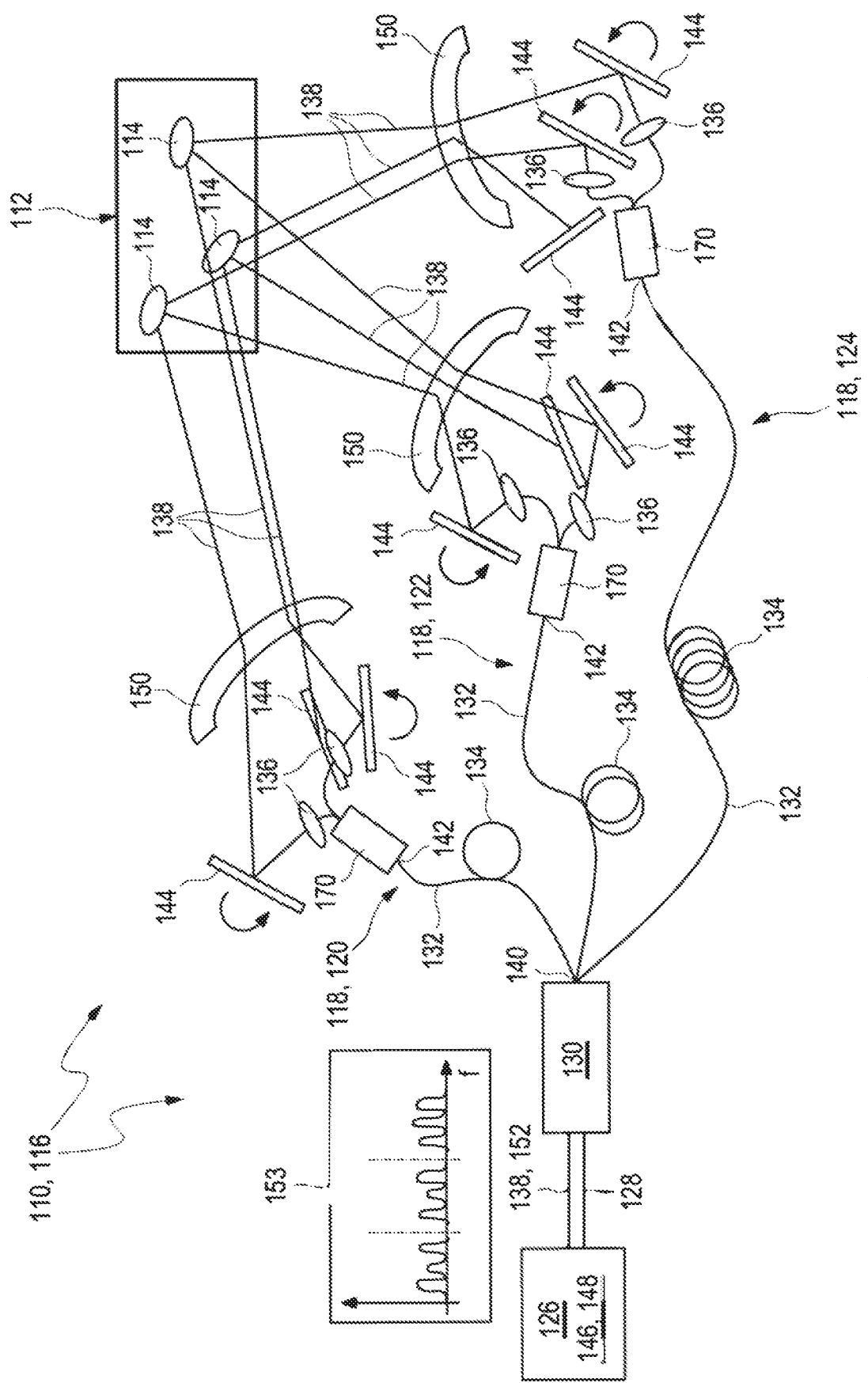
FIG. 6 shows a schematic illustration of an apparatus according to of a fourth exemplary embodiment of the invention.

FIG. 6 shows a fourth exemplary embodiment. In respect of the fourth exemplary embodiment, reference can be largely made to the description of the first, second and third exemplary embodiments in FIGS. 1 to 5. In the fourth exemplary embodiment, the first beam splitter 130 can be configured to divide the input light beam 128 among the three measurement channels 118 in parallel. The LIDAR unit 116 can be configured to simultaneously impinge the measurement channels 118 with the input light beam 128 by way of a parallel multiplexer and input couple said input light beam into the respective optical fiber 132, which is characterized by the individual length offset 134. A second beam splitter 170, for example a further parallel multiplexer, can be arranged in each measurement channel 118 at the respective fiber end 142. Further, each measurement channel can have a plurality of mirrors 144, in particular deflection mirrors. The mirrors 144 in a measurement channel 118 are in each case configured to steer a light beam, which was deflected from the optical fiber 132 to the mirror 144, onto exactly one retroreflector 114. Consequently, a mirror 144 can be assigned to a retroreflector 114 in one measurement channel 118. By way of the second beam splitter 170, the input light beam 128, at the fiber end 142 in each measurement channel 118, can be deflected onto at least three mirrors 144 per measurement channel 118 in parallel such that all retroreflectors 114 are illuminated simultaneously. The respective retroreflector 114 can send back some of the beam incident thereon. The reflected light beam 138 can propagate back through the optical unit 150, which consequently becomes an input coupling optical unit into the optical fiber 132, and back through the first beam splitter 130, which consequently leads to a superposition of all reflected beams 138 of the measurement channels 118. The LIDAR unit 116 can be configured to superpose a reference light beam, in particular a current input light beam, on the superposed beams such that interferences arise. A beat signal can arise in this exemplary embodiment, the frequency spectrum of which includes at least nine relevant peaks, from which the 6D information items are determined. A frequency spectrum 153 is illustrated in FIG. 6 in an exemplary fashion. In respect of the evaluation, reference can be made to the description of the first exemplary embodiment. This exemplary embodiment can be particularly advantageous since a simple separation of the peaks is possible and an evaluation is therefore simplified. This fourth exemplary embodiment allows a determination of 6D information items with an improved accuracy and less complexity. The measurement accuracy only depends directly on the accuracy of the LIDAR unit, which can be particularly insensitive to noise.

In this exemplary embodiment, the apparatus 110 can be configured to track individual retroreflectors. The apparatus 110 can be configured to carry out an independent tracking measurement for each measurement channel 118 and each individual retroreflector 114. The tracking frequency can be determined by the readout frequency of the LIDAR unit 116.

Figure 7:
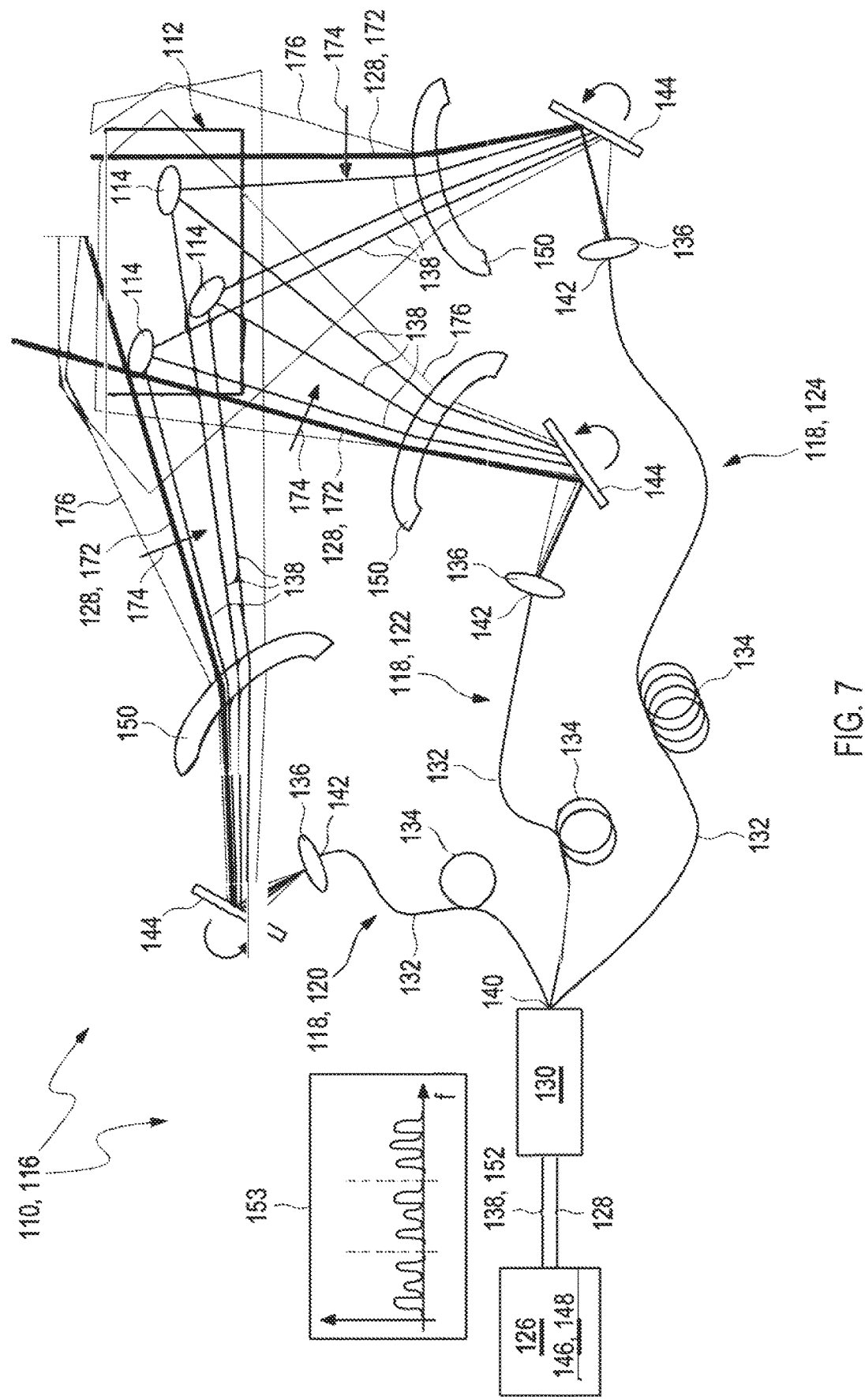
FIG. 7 shows a schematic illustration of an apparatus according to a fifth and sixth exemplary embodiment the invention.

FIG. 7 shows a fifth exemplary embodiment. In respect of the fifth exemplary embodiment, reference can be largely made to the description of the first, second, third, and fourth exemplary embodiments in FIGS. 1 to 6. In the fifth exemplary embodiment, the first beam splitter 130 can be configured to divide the input light beam 128 among the three measurement channels 118 in parallel. The LIDAR unit 116 can be configured to simultaneously impinge the measurement channels 118 with the input light beam 128 by way of a parallel multiplexer and input couple said input light beam into the respective optical fiber 132, which is characterized by the individual length offset 134. Further, each measurement channel 118 can have at least one mirror 144, in particular a deflection mirror, which can be operated in scanning fashion in this exemplary embodiment. The mirror 144 can be set continuously or non-continuously in such a way that the mirror 144 adopts different angle positions. The measurement channels 118 can have the at least one optical unit 150, which is configured in such a way that the light beam sweeps over a solid angle in time as a result of a laser line or laser raster scan. As an alternative or in addition thereto, like in exemplary embodiments two, three and four, for example, the optical unit 150 can be configured to focus on at least one of the retroreflectors 114, in each case in tracking fashion. The measurement channels 118 can each have the at least one optical unit 150 that is configured to expand the input light beam 128 into a laser line 172 such that a solid angle region is swept by the laser line during a scanning operation of the mirror 144, i.e., during a movement process of the laser line 172 of the input light beam 128, a so-called laser line scan, at least three retroreflectors 114 being situated in said solid angle region, for example by way of a linear or rotational movement of the laser line. An exemplary movement direction is illustrated using arrows 174 in FIG. 7. Further, FIG. 7 shows a movement range 176 in exemplary fashion, the laser line 172 sweeping over said movement range during the movement process. All retroreflectors 114 that were swept over at a certain time can send back some of the beam incident thereon. The reflected light beam 138 can propagate back through the optical unit 150, which consequently becomes an input coupling optical unit into the optical fiber 132, and back through the first beam splitter 130, which consequently leads to a superposition of all reflected beams of the measurement channels 118. The LIDAR unit 116 can be configured to superpose a reference light beam, in particular a current input light beam 128, on the superposed beams such that interferences arise. A beat signal can arise in this exemplary embodiment, the frequency spectrum of which, integrated over a laser line scan in time, includes at least nine relevant peaks, from which the 6D information items are determined. A frequency spectrum 153 is illustrated in FIG. 7 in an exemplary fashion. In respect of the evaluation, reference can be made to the description of the first exemplary embodiment. This fifth exemplary embodiment allows a determination of 6D information items with an improved accuracy and less complexity. The measurement accuracy only depends directly on the accuracy of the LIDAR unit 116, which can be particularly insensitive to noise. Furthermore, changing at least one retroreflector 114 on the object 112 can be very simple as no individual retroreflectors 114 are illuminated; instead, at least three retroreflectors 144 are irradiated when sweeping over the solid angle region.

In this exemplary embodiment, the apparatus 110 can be configured to track the object 112. As explained above, an expanded light beam can be used in the fifth exemplary embodiment in such a way that at least three retroreflectors 114 of the object 112 are irradiated by the laser line when sweeping over the solid angle region. The evaluation unit 148 can be configured to determine a center point 166 of the three measurement channel groups 168 in the frequency spectrum in each case and determine an approximate 3D point of the object 112 therefrom. This approximate 3D point can be used for object tracking. Tracking the object 112 can be implemented in simple fashion since only an approximate determination of the position and tracking of same are necessary when an expanded beam is used. Further, tracking can be implemented quickly as a result of the parallel measurement. The tracking frequency can correspond to the readout frequency of the LIDAR unit 116, for example 1 to 10 kHz; in particular, the duration of sweeping over the solid angle range with the laser line additionally sets the tracking frequency. Since tracking by way of the LIDAR signals is possible, it is possible to dispense with an additional tracking unit.

In a sixth exemplary embodiment (likewise shown in FIG. 7), the first beam splitter 130 can be configured to divide the input light beam 128 among the three measurement channels 118 in parallel. The LIDAR unit 116 can be configured to simultaneously impinge the measurement channels 118 with the input light beam 128 by way of a parallel multiplexer and input couple said input light beam into the respective optical fiber 132, which is characterized by the individual length offset 134. Further, each measurement channel 118 can have at least one mirror 144, in particular a deflection mirror, which can be operated in scanning fashion in this exemplary embodiment. The mirror 144 can be set in such a way that the mirror 144 adopts different angle positions. The measurement channels 118 can each have the at least one optical unit 150 which is configured to radiate a light beam into a given solid angle such that, during scanning operation of the mirror, i.e., during a movement process of the laser beam, in which one or more, contiguous or non-contiguous solid angle regions are scanned line-by-line or column-by-column, a so-called laser raster scan, at least three retroreflectors 114 are swept over. By way of example, the measurement channels 118 can each have a wide-angle lens. All retroreflectors 114 that were swept over at a certain time can send back some of the beam incident thereon. The reflected light beam 138 can propagate back through the optical unit 150, which consequently becomes an input coupling optical unit into the optical fiber 132, and back through the first beam splitter 130, which consequently leads to a superposition of all reflected beams of the measurement channels 118. The LIDAR unit 116 can be configured to superpose a reference light beam, in particular a current input light beam, on the superposed beams such that interferences arise. A beat signal can arise in this variant, the frequency spectrum of which, integrated over a laser raster scan in time, includes at least nine relevant peaks, from which the 6D information items are determined. In respect of the evaluation, reference can be made to the description of the first exemplary embodiment. This exemplary embodiment allows a determination of 6D information items with an improved accuracy and less complexity. The measurement accuracy only depends directly on the accuracy of the LIDAR unit 116, which can be particularly insensitive to noise. Furthermore, changing at least one retroreflector 114 on the object 112 can be very simple as no individual retroreflectors 114 are illuminated; instead, at least three retroreflectors 114 are irradiated when sweeping over the solid angle region.

Figure 8:
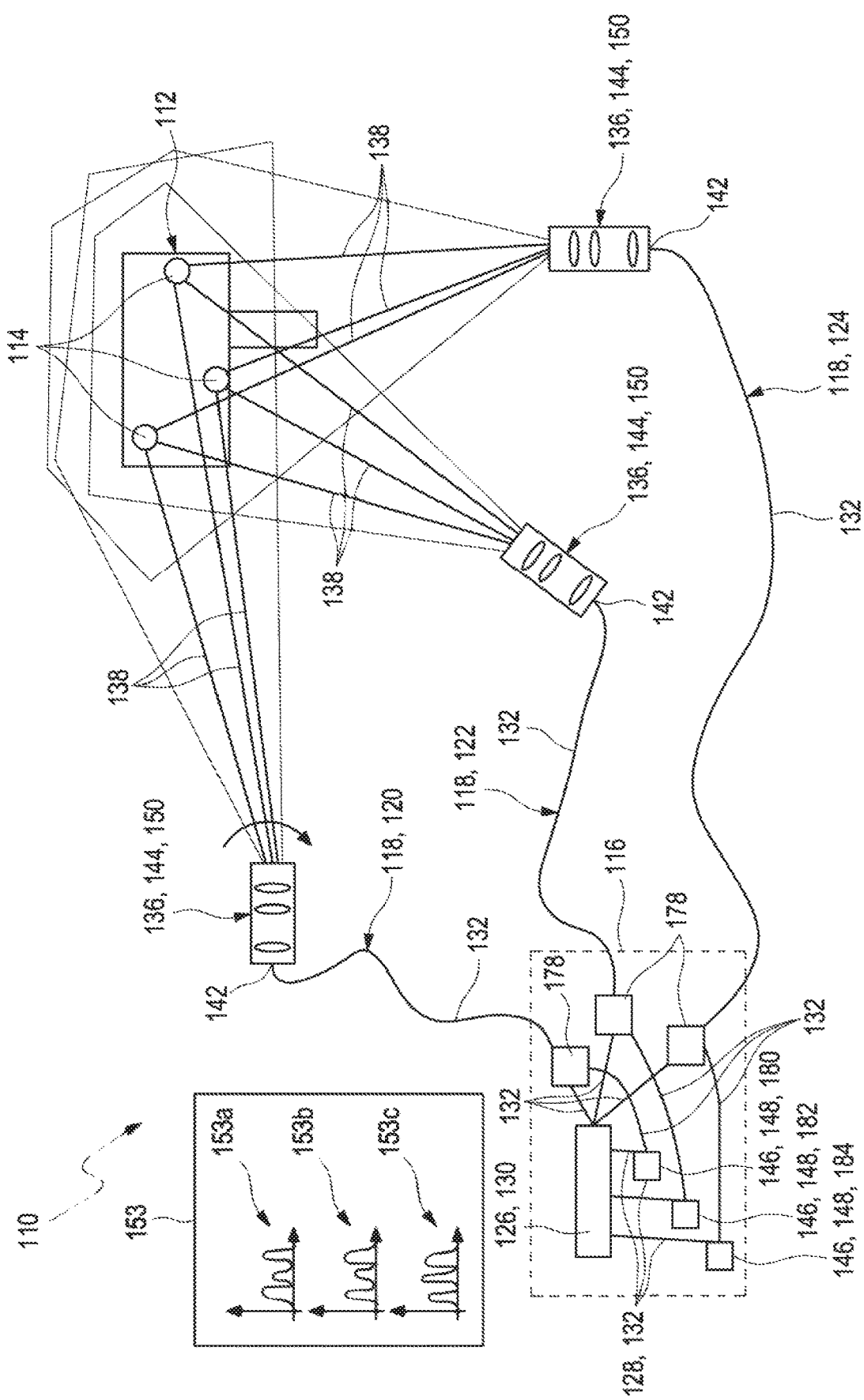
FIG. 8 shows a schematic illustration of an apparatus according to a further exemplary embodiment the invention.

FIG. 8 shows an exemplary embodiment without a length offset 134. The LIDAR unit 116, in particular the FMCW LIDAR unit, can be configured to divide the light beams 138 reflected by the retroreflectors 114 and to evaluate these light beams. The LIDAR unit can have at least one sensor element 146 for each measurement channel 118. The sensor elements 146 of the individual measurement channels 118 can be independent of those of the other measurement channels 118. An input light beam 128 of the illumination device 126 can be separated by way of the first beam splitter 130, in particular a parallel multiplexer, into the at least three measurement channels 118 in optical fibers 132. At least one deflection mirror 144 with an adjustable deflection angle can be arranged at the fiber end 142, said deflection mirror expanding the input light beam 128 into a solid angle such that at least three retroreflectors 114 are irradiated by way of an optical unit, in particular a zoom optical unit, including the at least one first optical element 136 and/or the at least one optical unit 150. Each of the retroreflectors 114 can send back at least some of the beam incident thereon. The reflected light beams 138 can pass backward through the optical unit, said optical unit becoming an input coupling optical unit into the respective fiber 132.

Each of the measurement channels 118 can have at least one further beam splitter 178, which is configured to guide the reflected light beams 138 of the measurement channel 118 onto the at least one sensor element 146 of the measurement channel 118. For each measurement channel 118, the first beam splitter 130 can be configured to guide an input light beam 128 onto the sensor element 146 of the respective measurement channel. In the LIDAR unit 116, the input light beam 128 of the three measurement channels 118 can interfere with the current output signal of the respective measurement channel 118 on the respective sensor element 146. A beat signal can arise for each of the three measurement channels 118, the frequency spectrum 153 of which beat signal has a plurality of peaks. The evaluation unit 148 can be configured to determine the frequency spectrum 153 for each measurement channel 118. The evaluation unit 148 can be configured to determine a frequency spectrum of the LIDAR signal, in particular the beat signal, by a Fourier transform. By way of example, the first measurement channel 120 can have a first sensor element 180, the second measurement channel 122 can have a second sensor element 182, and the third measurement channel can have a third sensor element 184. In exemplary fashion, FIG. 8 shows a frequency spectrum 153a for the first sensor element 180, a frequency spectrum 153b for the second sensor element 182 and a frequency spectrum 153c for the third sensor element 184.

Exemplary measurement signals on the first sensor element 180 are shown in FIG. 9A, on the second sensor element 182 are shown in FIG. 9B and on the third sensor element 184 are shown in FIG. 9C, with seven peaks in each case. Consequently, the measurement channels 118 can each be assigned to a sensor element. The evaluation unit 148 can be configured to identify the peaks in the respective frequency spectrum. The evaluation unit 148 can be configured to determine a spatial position of the three retroreflectors 114 by evaluating the peak distribution and/or arrangement of the peaks. A complete 6D information item can be determined in the case of a known arrangement of the retroreflectors on the object 112.

It is understood that the foregoing description is that of the exemplary embodiments of the invention and that various changes and modifications may be made thereto without departing from the spirit and scope of the invention as defined in the appended claims.

LIST OF REFERENCE NUMERALS

110 Apparatus
112 Object
114 Retroreflector
116 LIDAR unit
118 Measurement channel
120 1st Measurement channel
122 2nd Measurement channel
124 3rd Measurement channel
126 Illumination device
128 Input light beam
130 First beam splitter
132 Optical fiber
134 Length offset
136 First optical element
138 Reflected light beam
140 Fiber beginning
142 Fiber end
144 Mirror
146 Sensor element
148 Evaluation unit
150 Optical unit
152 Superposed beams
153 Frequency spectrum
153a Frequency spectrum
153b Frequency spectrum
153c Frequency spectrum
154 Region of interference between measurement signals
156 Distance
158 Arrow
160 Distance
162 Width of the measurement channel groups
164 Length
166 Centre point
168 Measurement channel groups
170 2nd Beam splitter
172 Laser line
174 Arrows
176 Movement region
178 Further beam splitter
180 First sensor element
182 Second sensor element
184 Third sensor element

What is claimed is:

1. An apparatus for determining a spatial position and an orientation of an object, the apparatus comprising:
   at least three retroreflectors arranged on the object;
   a light detection and ranging (LIDAR) unit having at least three measurement channels each configured to produce at least one measurement signal, the LIDAR unit being configured to produce at least one LIDAR signal for the at least one measurement signal, the LIDAR unit including an illumination device configured to produce at least one frequency modulated input light beam, and at least one first beam splitter configured to divide the at least one frequency modulated input light beam among the at least three measurement channels in parallel and/or in sequence; and
   a controller configured to determine the spatial position and the orientation of the object from the at least one LIDAR signal,
   wherein each of the at least three measurement channels includes at least one optical fiber,
   wherein each of the at least one optical fiber has a length offset defining an optical delay line configured to delay the at least one frequency modulated input light beam and at least one reflected light beam, and
   wherein the LIDAR unit is configured to:
   superpose a reference light beam on the at least one measurement signal to produce the at least one LIDAR signal, the at least one LIDAR signal including at least one information item about a frequency difference between the reference light beam and the at least one measurement signal,
   determine a frequency spectrum of an arising beat signal,
   determine at least three peaks in the frequency spectrum for each of the at least three retroreflectors, and
   determine the spatial position and the orientation of the object from the at least three peaks in the frequency spectrum.

2. The apparatus according to claim 1, wherein the at least three measurement channels are configured to be at least partly separated from one another in space and/or time.

3. The apparatus according to claim 1, wherein each of the at least three measurement channels includes at least one static or adjustable mirror.

4. The apparatus according to claim 1, wherein each of the at least three measurement channels includes at least one first optical element configured to output-couple the at least one frequency modulated input light beam passing through a respective optical fiber out of the at least one optical fiber and input-couple the at least one reflected light beam reflected by at least one of the at least three retroreflectors into the respective optical fiber.

5. The apparatus according to claim 1, further comprising:
   at least one sensor element for each of the at least three measurement channels,
   wherein a sensor element of a respective measurement channel is independent of other sensor elements of other measurement channels.

6. The apparatus according to claim 1, wherein each of the at least three measurement channels includes at least one optical unit configured to expand a light beam into a solid angle to permit the at least three retroreflectors to be irradiated.

7. The apparatus according to claim 1, wherein each of the at least three measurement channels includes the at least one optical unit configured to permit a light beam to at least one of (a) sweep over a solid angle over time by way of a laser line or laser raster scan, and (b) respectively focus on at least one of the retroreflectors in tracking fashion.

8. The apparatus according to claim 1, wherein:
each of the at least three measurement channels includes at least one second beam splitter,
the at least one second beam splitter is arranged downstream of a respective optical fiber of a respective measurement channel in a propagation direction of the at least one frequency modulated input light beam, and
the at least one second beam splitter is configured to provide the at least one frequency modulated input light beam in parallel and/or in sequence to illuminate at least one of the retroreflectors.

9. A method for determining a spatial position and an orientation of an object by the apparatus for determining the spatial position and the orientation of the object according to claim 1, the apparatus including the at least one LIDAR unit with the at least three measurement channels, the method comprising:
providing the object with at least three retroreflectors;
producing the at least one frequency modulated input light beam by the illumination device of the LIDAR unit;
dividing the input light beam among the at least three measurement channels in parallel and/or in sequence by the at least one first beam splitter;
producing the at least one measurement signal by each of the at least three measurement channels;
superposing the reference light beam on the at least one measurement signal to produce the at least one LIDAR signal by the LIDAR unit for the at least one measurement signal, the at least one LIDAR signal including the at least one information item about a frequency difference between the reference light beam and the at least one measurement signal;
determining the frequency spectrum of an arising beat signal;
determining the at least three peaks in the frequency spectrum for each of the at least three retroreflectors; and
determining the spatial position and the orientation of the object from the at least three peaks in the frequency spectrum with the controller.

10. The method according to claim 9, further comprising:
determining at least one frequency spectrum for at least one retroreflector with a known spatial position;
determining at least three peaks in the at least one frequency spectrum; and
calibrating the at least three peaks by the known spatial position of the at least one retroreflector.

11. An apparatus for determining a spatial position and an orientation of an object, the apparatus comprising:
at least three retroreflectors arranged on the object;
a light detection and ranging (LIDAR) unit having at least three measurement channels each configured to produce at least one measurement signal, the LIDAR unit being configured to produce at least one LIDAR signal for the at least one measurement signal, the LIDAR unit including an illumination device configured to produce at least one frequency modulated input light beam, and at least one first beam splitter configured to divide the at least one frequency modulated input light beam among the at least three measurement channels in parallel and/or in sequence; and
a controller configured to:
superpose a reference light beam on the at least one measurement signal to produce the at least one LIDAR signal, the at least one LIDAR signal including at least one information item about a frequency difference between the reference light beam and the at least one measurement signal,
determine a frequency spectrum of an arising beat signal,
determine at least three peaks in the frequency spectrum for each of the at least three retroreflectors, and
determine the spatial position and the orientation of the object from the at least three peaks in the frequency spectrum, and
wherein each of the at least three measurement channels includes the at least one optical unit configured to permit a light beam to at least one of (a) sweep over a solid angle over time by way of a laser line or laser raster scan, and (b) respectively focus on at least one of the retroreflectors in tracking fashion.

12. The apparatus according to claim 11, wherein the at least three measurement channels are configured to be at least partly separated from one another in space and/or time.

13. The apparatus according to claim 11, wherein each of the at least three measurement channels includes at least one static or adjustable mirror.

14. The apparatus according to claim 11, wherein each of the at least three measurement channels includes at least one first optical element configured to output-couple the at least one frequency modulated input light beam passing through a respective optical fiber out of the at least one optical fiber and input-couple the at least one reflected light beam reflected by at least one of the at least three retroreflectors into the respective optical fiber.

15. The apparatus according to claim 11, further comprising:
at least one sensor element for each of the at least three measurement channels,
wherein a sensor element of a respective measurement channel is independent of other sensor elements of other measurement channels.

16. The apparatus according to claim 11, wherein each of the at least three measurement channels includes at least one optical unit configured to expand a light beam into a solid angle to permit the at least three retroreflectors to be irradiated.

17. The apparatus according to claim 11, wherein the LIDAR unit is configured to:
superpose a reference light beam on the at least one measurement signal and determine a frequency spectrum of an arising beat signal,
determine at least three peaks in the frequency spectrum for each of the at least three retroreflectors, and
determine the spatial position and the orientation of the object from the at least three peaks in the frequency spectrum.

18. The apparatus according to claim 11, wherein:
each of the at least three measurement channels includes at least one second beam splitter,
the at least one second beam splitter is arranged downstream of a respective optical fiber of a respective measurement channel in a propagation direction of the at least one frequency modulated input light beam, and
the at least one second beam splitter is configured to provide the at least one frequency modulated input light beam in parallel and/or in sequence to illuminate at least one of the retroreflectors.

19. A method for determining a spatial position and an orientation of an object by the apparatus for determining the spatial position and the orientation of the object according to claim 11, the apparatus including the at least one LIDAR unit with the at least three measurement channels, the method comprising:
- providing the object with at least three retroreflectors;
- producing the at least one frequency modulated input light beam by the illumination device of the LIDAR unit;
- dividing the input light beam among the at least three measurement channels in parallel and/or in sequence by the at least one first beam splitter;
- producing the at least one measurement signal by each of the at least three measurement channels;
- producing the at least one LIDAR signal by the LIDAR unit for the at least one measurement signal; and
- determining the spatial position and the orientation of the object from the LIDAR signal with the controller.

20. The method according to claim 19, further comprising:
- determining at least one frequency spectrum for at least one retroreflector with a known spatial position;
- determining at least three peaks in the at least one frequency spectrum; and
- calibrating the at least three peaks by the known spatial position of the at least one retroreflector.

* * * * *